United States Patent
Sapru et al.

(10) Patent No.: US 12,066,983 B2
(45) Date of Patent: Aug. 20, 2024

(54) BUILDING COLLABORATIVE DATA PROCESSING FLOWS

(71) Applicant: Salesforce, inc., San Francisco, CA (US)

(72) Inventors: Kongposh Sapru, Redwood City, CA (US); Joshua Goodman, Portland, OR (US); Alexander John Trzeciak, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/158,228

(22) Filed: Jan. 23, 2023

(65) Prior Publication Data

US 2023/0161738 A1 May 25, 2023

Related U.S. Application Data

(63) Continuation of application No. 16/546,677, filed on Aug. 21, 2019, now Pat. No. 11,561,936.

(51) Int. Cl.
*G06F 16/176* (2019.01)
*G06F 16/25* (2019.01)
*G06Q 30/016* (2023.01)
*H04L 67/131* (2022.01)

(52) U.S. Cl.
CPC .......... *G06F 16/176* (2019.01); *G06F 16/252* (2019.01); *G06Q 30/016* (2013.01); *H04L 67/131* (2022.05)

(58) Field of Classification Search
CPC .............................. G06F 16/176; G06F 16/252
See application file for complete search history.

(56) References Cited

U.S. PATENT DOCUMENTS

| | | | | |
|---|---|---|---|---|
| 10,467,593 | B2* | 11/2019 | White | G06Q 10/10 |
| 2007/0255715 | A1* | 11/2007 | Li | G06Q 10/00 |
| 2009/0271713 | A1* | 10/2009 | Stull | G06Q 10/10 715/753 |
| 2009/0327302 | A1* | 12/2009 | Richardson | G06F 16/176 |
| 2013/0218829 | A1* | 8/2013 | Martinez | G06Q 10/10 707/608 |
| 2013/0246901 | A1* | 9/2013 | Massand | G06F 40/197 715/229 |

(Continued)

*Primary Examiner* — Hosain T Alam
*Assistant Examiner* — Robert F May
(74) *Attorney, Agent, or Firm* — Holland & Hart LLP

(57) ABSTRACT

Methods, systems, and devices supporting managing a data processing flow are described. A device (e.g., an application server) may host a cloud-based collaboration application, such as an interactive document application. The device may receive an instance of a data processing flow for a flow application based on a first user input to the cloud-based collaboration application. The device may receive the instance of the data processing flow from a source device hosting the flow application. The device may embed the flow application in the cloud-based collaboration application. The device may then receive user inputs to the data processing flow from multiple users collaborating on the same flow in the cloud-based collaboration application. Based on the user inputs, the device may modify the instance of the data processing flow and transmit the modified instance back to the source device to synchronize the data processing flow in the flow application.

20 Claims, 14 Drawing Sheets

(56) References Cited

U.S. PATENT DOCUMENTS

| | | | |
|---|---|---|---|
| 2014/0172925 A1* | 6/2014 | Goldbrenner | G06F 16/22 707/812 |
| 2015/0277727 A1* | 10/2015 | Jemiolo | G06F 40/197 715/704 |
| 2016/0259630 A1* | 9/2016 | Roos | G06Q 10/101 |
| 2017/0048285 A1* | 2/2017 | Pearl | G06F 16/11 |
| 2017/0257406 A1* | 9/2017 | Wilde | H04L 51/216 |
| 2018/0059910 A1* | 3/2018 | Wooten | G06Q 10/101 |
| 2018/0367484 A1* | 12/2018 | Rodriguez | H04L 51/10 |
| 2019/0012220 A1* | 1/2019 | Sumioka | G06F 9/542 |
| 2019/0213243 A1* | 7/2019 | Silk | G06F 16/27 |
| 2021/0019846 A1* | 1/2021 | Kaddoura | G06Q 30/0631 |

\* cited by examiner

BUILDING COLLABORATIVE DATA PROCESSING FLOWS

CROSS REFERENCES

The present application for patent is a continuation of U.S. patent application Ser. No. 16/546,677 by Sapru et al., entitled "BUILDING COLLABORATIVE DATA PROCESSING FLOWS," filed Aug. 21, 2019, which is assigned to the assignee hereof and which is expressly incorporated by reference herein.

FIELD OF TECHNOLOGY

The present disclosure relates generally to database systems and data processing, and more specifically to building collaborative data processing flows.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, CRM solutions, among other solutions, may benefit from collaboration in data processing flows. A data processing flow may automate an activity or a task that involves leveraging data, such as CRM data. In some systems, users may be able to build a data processing flow using an interface. However, current flow building techniques may have limited capabilities. Specifically, current data flow building applications lack functionality to support real-time collaboration between users when designing data processing flows.

DETAILED DESCRIPTION

Figure 1:
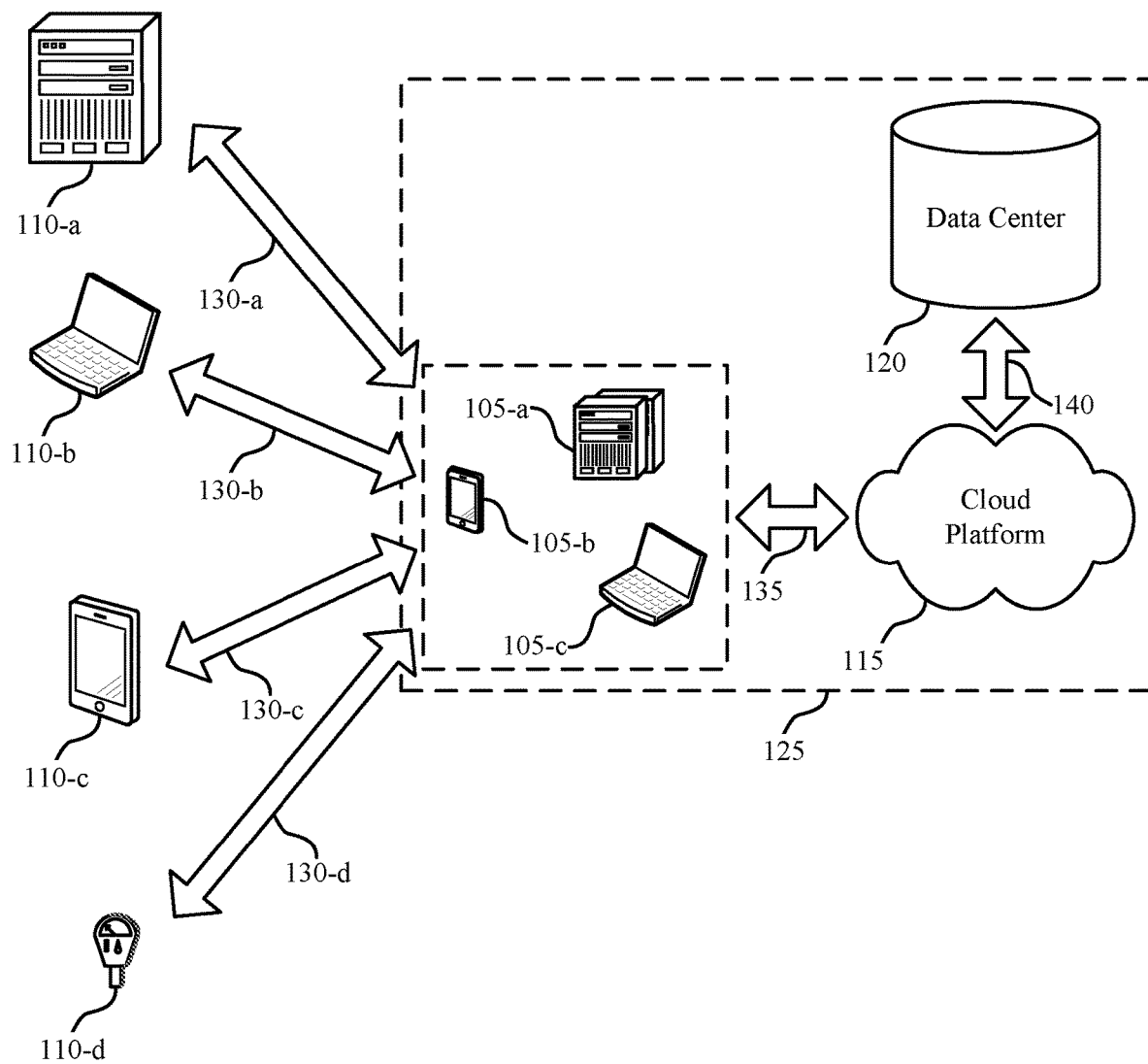
FIG. 1 illustrates an example of a system for cloud computing that supports building collaborative data processing flows in accordance with aspects of the present disclosure.

Some systems (e.g., customer relationship management (CRM) systems supporting one or more datasets) may support data processing flows. A data processing flow may automate a set of data processes according to a particular sequence or schedule, where the schedule or sequence may be defined by a user (e.g., in a user-friendly, interactive flow application, such as a flow builder). The data processes may include reading data, writing data, displaying data, collecting data, manipulating data, executing logic on or according to data, or any combination of these or other data processes. In some examples, the data processing flow may support the automation of one or more business processes by collecting and using CRM data associated with a tenant of a multi-tenant system. In some cases, the data processing flow may leverage data, functionality, or both across multiple systems or applications. For example, the data processing flow may automate events based on tenant-specific data, where the events are executed in an application external to a CRM application managing the tenant-specific data.

In some systems, multiple users may manage a shared data processing flow. To allow for efficient collaboration between the users at design time, a real-time collaboration application may support flow building. Such an application may be an example of a collaborative document editing application which may receive an instance of a data processing flow (e.g., a data flow from a flow application) and may support concurrent editing of the flow by multiple users. For example, the application may display an interactive version of the data processing flow on multiple user devices and may receive one or more user inputs to the data processing flow. The application may update the instance of the data processing flow (to generate a new instance or a modified instance of the data processing flow) based on the user inputs. As one example, the application may embed the instance of the data processing flow in a cloud-based, collaborative document upon receiving the instance from a source device hosting the data processing flow. After embedding the instance of the data processing flow, the application may receive an input to modify the instance of the data processing flow. For example, the application may receive the input from a user of the application. The application (hosted on an application server), upon receiving the input, may modify the instance of the data processing flow and may transmit the modified instance of the data processing flow to the source device (e.g., based on the modification or based on a triggered synchronization procedure). The source device (i.e., the device hosting the data processing flow application), upon receiving the modified instance of the data processing flow, may update the instance of the data processing flow stored in the source device. In this way, the now out-of-sync instance of the data processing flow at the source device (e.g., in a flow application) may be synchronized with the latest version of the data processing flow updated in the cloud-based collaboration application.

A flow application (e.g., a flow builder) for building data processing flows, such as enterprise flows or business flows, may not support this level of seamless collaboration between users. For example, the flow application may be used for implementing a sequence of data processes, business activities, or tasks that involve leveraging capabilities included in one or more applications. For example, a user may be able to create a data processing flow (such as, an enterprise flow) that can retrieve, create, update, and/or display data based on information in one or more applications. In some examples, a data processing flow may include a set of capabilities available in each application (i.e., in each application included in the data processing flow), and may implement an activity or task using the set of capabilities available in each application. In some cases, data processing flow may be used to automate processes which may perform business operations. By using data processing flows, a user may be able to create a new service leveraging existing capabilities of multiple applications. However, the process of building a data processing flow may be complex. Although some flow applications may provide an interface for a user to build a data processing flow, these applications may lack functionality to support real-time collaboration when designing data processing flows. For example, a flow application running locally on a user device, on a dedicated server, or in any non-real-time or secure, single-access environment may not support two or more users simultaneously modifying a data processing flow.

In contrast, one or more aspects of the present disclosure support real-time flow collaboration based on a cloud-based application (e.g., supporting flow building or connected to a flow building application). Specifically, one or more aspects of the present disclosure support a system and method to integrate the creation of data processing flows into a real-time collaboration application (for example, a cloud-based document application, such as Quip). That is, an application server hosting the cloud-based document application may embed a flow application in the cloud-based application. For example, a user may select to load or create a data processing flow in a collaborative document hosted on the cloud. The server hosting the cloud-based document may retrieve an instance of the requested data processing flow from a flow application on a source device, such as a different server, a user device, etc. (e.g., if the user selects to load a data processing flow from the flow application), or may create a new instance of a data processing flow (e.g., if the user selects to create a new data processing flow). The server may display the instance of the data processing flow in a user interface for the cloud-based document application. For example, the server may embed the instance of the data processing flow into the cloud-based document application. By embedding the data processing flow in the collaborative document (or another collaborative application), multiple users may view, revise, and/or comment on the data processing flow (e.g., an enterprise flow) at design time for the data processing flow.

According to one or more aspects of the present disclosure, the application server hosting the collaborative document may receive updates to the data processing flow within the cloud-based collaboration application from multiple users collaborating on the document. In such cases, the application server may modify the instance of the data processing flow hosted at the server. That is, the server hosting the cloud-based document application may modify the embedded instance of the data processing flow based on the input received from one or more users. Once the instance of the data processing flow is ready for deployment, a user may select to synchronize the data processing flow with the underlying flow application. Additionally or alternatively, the server may automatically synchronize the instance of the data processing flow with an instance of the data processing flow hosted by the underlying flow application. In some cases, the application server (i.e., the server hosting the cloud-based document) may push the modified instance of the data processing flow to the underlying flow application running on a source device, and the source device may replace the previous instance of the data processing flow with the new instance of the data processing flow modified in the collaborative environment. According to one or more aspects, the server hosting the cloud-based document may support sharing the flow via emails, workplace collaboration sites, knowledge articles, community threads, etc. Thus, the present disclosure provides for a real-time collaborative environment in which two or more users can concurrently modify a data processing flow and each user can view the modifications made by other users in real-time.

Aspects of the disclosure are initially described in the context of an environment supporting an on-demand database service. Additional aspects are described with reference to collaboration procedures, systems that support building collaborative data processing flows, and a process flow. Aspects of the disclosure are further illustrated by and described with reference to apparatus diagrams, system diagrams, and flowcharts that relate to building collaborative data processing flows.

FIG. 1 illustrates an example of a system 100 for cloud computing that supports building collaborative data processing flows in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A device (e.g., any component of subsystem 125, such as a cloud client 105, a server or server cluster associated with the cloud platform 115 or data center 120, etc.) may perform any combination of the following techniques and procedures to support real-time collaboration to design and/or create data processing flows. For example, the device (e.g., an application server, such as a cloud-based server) may enable multiple users to collaborate on a data processing flow when designing the data processing flow. In general, a flow application for building data processing flows may be used for implementing a sequence of data processes. For example, the sequence of data processes may include one or more elements, one or more connectors, one or more resources, one or more values associated with the data processing flow, or a combination thereof. In some cases, a user may be able to create a data processing flow that can retrieve, create, update, and/or display data based on information in one or more applications included in the data processing flows. A device (e.g., any component of subsystem 125, such as a server or server cluster associated with the cloud platform 115) described herein, may support two or more users simultaneously modifying a data processing flow embedded in a cloud-based collaboration application (such as a cloud-based document application).

The device may host the cloud-based collaboration application. In some examples, multiple users may be able to view and/or access the cloud-based collaboration application (such as a cloud-based document application) hosted at the device. In one example, each user or user device may be associated with a user credential or user identifier (ID), and each user may log on to the cloud-based collaboration application using the user credential or user ID. The user devices (e.g., the cloud clients 105) may display, in their user interfaces, the cloud-based collaboration application hosted in the cloud platform by the device (e.g., the application server). In some cases, the device may retrieve an instance of a data processing flow from a flow application hosted at a source device. In some cases, upon receiving the instance of the data processing flow, the device may embed the flow application in the cloud-based collaboration application. In addition, the device (such as an application server hosting the cloud-based collaboration document) may receive updates to the data processing flow within the cloud-based collaboration application. As one example, the device may receive the updates from multiple users collaborating on the cloud-based collaboration document. For example, each user accessing the cloud-based collaboration document on a user device may modify the data processing flow in the user device's user interface (while viewing the modifications made by the other users in the other user devices accessing the same cloud-based collaboration document). In some examples, the device may modify the instance of the data processing flow hosted at the device, and may support sharing the modified flow via emails, workplace collaboration sites, knowledge articles, community threads, etc. For example, the modified flow may be shared using a link (e.g., a copy of the uniform resource locator (URL) for the cloud-based collaboration document).

In conventional systems, a user may be able to create a data processing flow for implementing a sequence of data processes. Although conventional systems may provide an interface for a user to build a data processing flow, these systems supporting flow applications lack functionality to support real-time collaboration when designing data processing flows. For example, if two users edit a data processing flow in a conventional system, each user may not see the changes made by the other user. As such, the changes may result in inconsistencies between users, and one user saving the modified flow may override updates made by the other user. Accordingly, conventional systems do not have the capability to support a real-time collaborative environment in which two or more users can simultaneously modify a data processing flow. This may not allow users to write comments related to flows in the flow building interface, correct mistakes by other users prior to deployment, share flows at design time, or some combination of these features.

In contrast, the system 100 implements procedures and techniques for managing a data processing flow in a cloud-based collaboration application. According to one or more aspects of the present disclosure, the system 100 may support an application server (e.g., a cloud-based server) receiving an instance of the data processing flow for a flow application hosted at a source device (e.g., a different server, the same server, a user device, etc.). In some cases, the application server of the system 100 may request for the instance of the data processing flow in response to receiving a user input to the cloud-based collaboration application. Upon receiving the instance of the data processing flow, the application server may embed the flow application in the cloud-based collaboration application. For example, the application server of the system 100 may retrieve an instance of the requested data processing flow from the source device and may display the retrieved data processing flow in a user interface for the cloud-based document application. That is, each user collaborating on the cloud-based document application (e.g., multiple cloud clients 105) may be able to view and/or modify the embedded data processing flow concurrently in the cloud-based document application.

In some examples, the application server of the system 100 may receive a user input that modifies the data processing flow. For example, one or more users collaborating on the cloud-based document application may request to update the instance of the embedded data processing flow. Such a request may involve adding, modifying, or deleting an element of the data processing flow, adding, modifying, or deleting a connector of the data processing flow, or some combination of these or other supported updates. In response to receiving the request, the application server of the system 100 may modify the instance of the data processing flow. For instance, the application server may modify the instance of the data processing flow based on a set of user inputs to the embedded flow application in the cloud-based collaboration application. In some cases, after the modification of the data processing flow, at least one user may choose to synchronize the modified instance of the data processing flow with the flow application hosted at the source device. In one example, upon receiving a request from a user, the application server of the system 100 may transmit the modified instance of the data processing flow to the source device. In some cases, the source device may update the data processing flow from a first instance (e.g., an initial instance of the data processing flow) to a modified instance of the flow in the flow application hosted at the source device.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
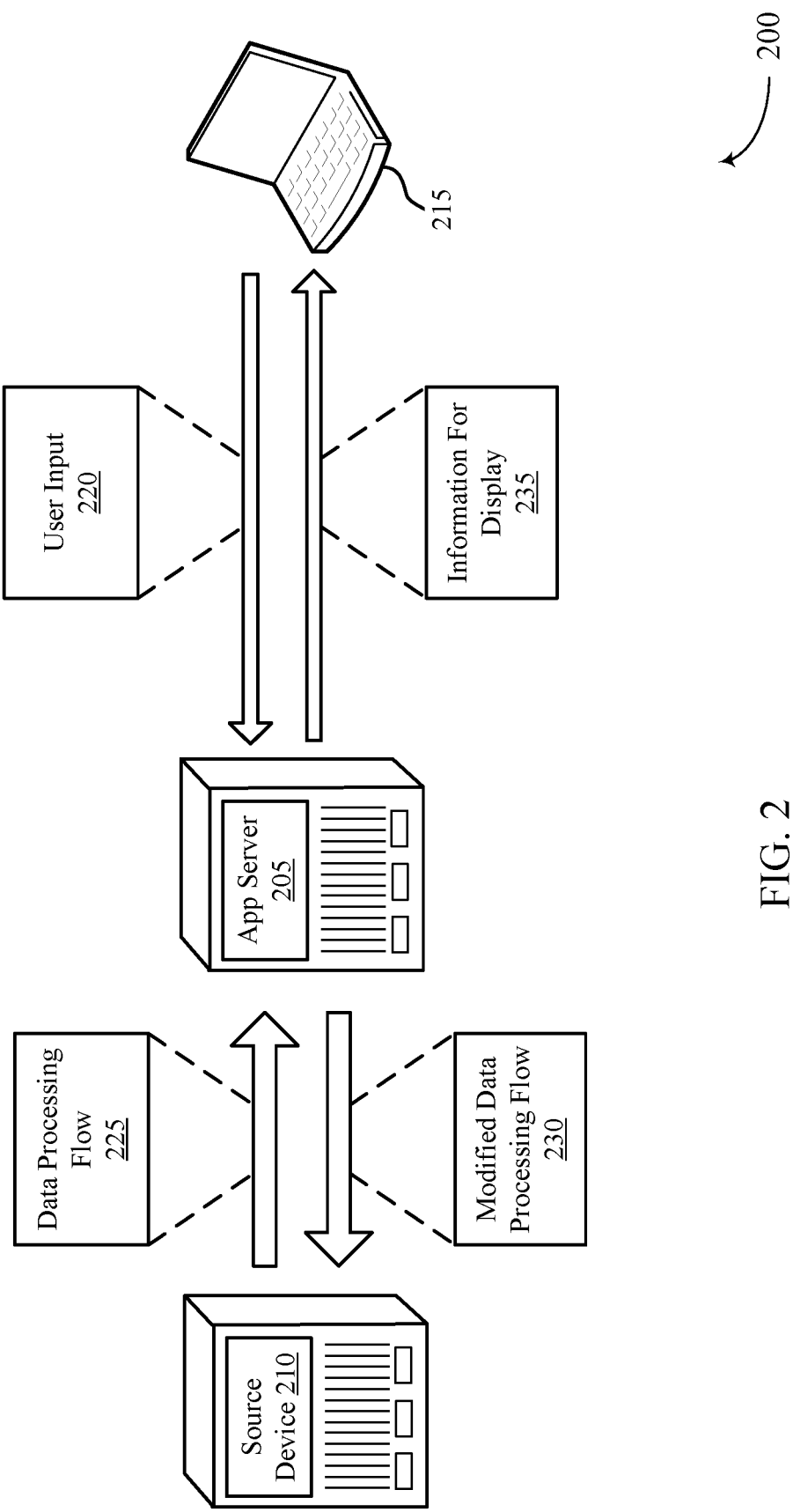
FIG. 2 illustrates an example of a system that supports building collaborative data processing flows in accordance with aspects of the present disclosure.

FIG. 2 illustrates an example of a system 200 that supports building collaborative data processing flows in accordance with aspects of the present disclosure. The system 200 may include an application server 205 (e.g., a device), a source device 210, and a user device 215. The application server 205 may be an example of a cloud-based server, a server cluster, a virtual machine, a container, or any other device supporting a cloud-based collaboration application. Although depicted as a server, it may be understood that the source device 210 may be a user device, a data storage system, or any other device supporting a flow application. In some cases, the functions performed by the application server 205 may instead be performed by a component of the source device 210, the user device 215, or both. The user device 215 may support accessing a cloud-based document application for collaboration. Specifically, the user device 215 in combination with the application server 205 may support a cloud-based document application that provides a real-time collaborative environment in which one or more users can simultaneously modify a data processing flow. A user operating the user device 215 may interact with the application to embed the data processing flow in the cloud-based application (such as a cloud-based document application) at the application server 205.

According to one or more aspects, the user device 215 may display an interface (e.g., a user interface) supporting viewing and interaction with one or more applications by the user operating the user device 215. For example, the user device 215 may transmit a user input 220 (such as a user input to the cloud-based document application) to an application server 205 hosting the cloud-based document application and may receive information for display 235 from the application server 205. For example, by running and/or accessing the cloud-based document application, the user device 215 may display a data processing flow (or a link to a cloud-based document containing the data processing flow). In some cases, a user (such as a client associated with a particular knowledge domain in a multi-tenant system) may utilize the user device 215 to log on to a cloud-based document application. In some examples, this cloud-based document application may be displayed (on user device 215) as a webpage within a web browser (e.g., as a software as a service (SaaS) product). In other examples, this cloud-based document application may be part of an application downloaded onto the user device 215. The cloud-based document application may support real-time updates to documents and other embedded applications and/or displays.

According to one or more aspects of the present disclosure, a user operating the user device 215 may be able to view the cloud-based application (such as a cloud-based document application) hosted at the application server 205. In one example, the user operating the user device 215 may be associated with a user credential or user ID, and the user may log on to the user device 215 using the user credential. In some cases, the user may also log on to the cloud-based application using a user credential. Although a single user device 215 is depicted herein, it may be understood that multiple user devices 215 may be able to simultaneously display the cloud-based application. In some examples, the application server 205 may transmit, to the user device 215, the cloud-based collaboration application for display. In some cases, the user operating the user device 215 may select to load or create a data processing flow in the collaborative application hosted on the application server 205. In one example, the application server 205 may receive a request to load an existing data processing flow. Upon receiving the request, the application server 205 may transmit the request (not shown) for a first instance of the existing data processing flow from a flow application hosted at the source device 210. In some examples, the first instance of the existing data processing flow may include a first sequence of data processes.

In some cases, upon receiving the request from the application server 205, the source device 210 may identify the first instance of the existing data processing flow and may transmit the first instance 225 of the existing data processing flow to the application server 205. The application server 205 may receive the first instance 225 of the existing data processing flow from the source device 210, and the application server 205 may embed the first instance 225 of the existing data processing flow in the cloud-based collaboration application hosted at the application server 205. That is, the application server 205 hosting the cloud-based document may retrieve an instance of the requested data processing flow from a flow application on the source device (e.g., a different server, a user device, etc.) and may create and/or display the retrieved data processing flow in a user interface (on the user device 215) for the cloud-based document application. In some other cases, upon receiving the request from the application server 205, the source device 210 may identify that the requested data processing flow is not stored at the source device 210 (e.g., the flow does not exist in the flow application). In these cases, the source device 210 may create a new data processing flow and may transmit this newly created instance to the application server 205. In yet other cases, the application server 205 may receive a request to create a new data processing flow. Upon receiving the request, the application server 205 may transmit a request (not shown) for an instance of the new data processing flow from the flow application hosted at the source device 210. The source device 210 may create the requested new data processing flow and may transmit an instance of the new data processing flow to the application server 205.

Upon receiving an instance of a data processing flow (such as a new data processing flow or an existing data processing flow), the application server 205 may embed the instance of the data processing flow in the cloud-based collaboration application. In some cases, embedding the instance of the data processing flow may involve embedding the flow application (or a portion of functionality for the flow application) in the cloud-based document. According to some examples, the application server 205 may push the embedded flow application for display on the user device 215. Additionally or alternatively, the application server 205 may provide an environment for multiple users to view, revise, and/or comment on the data processing flow at design time. That is, the application server 205 may provide for updating the data processing flow through the cloud-based document application by embedding the data processing flow in the cloud-based document application (such as a collaborative document).

In one or more examples, the application server 205 hosting the cloud-based document (such as, within a cloud-based document application) may receive an input 220 (i.e., a user input) from the user device 215. For example, a user operating the user device 215 may modify the displayed data processing flow embedded in the cloud-based document application (or cloud-based collaboration application) in the user interface. In some examples, the application server 205 may identify an update to the data processing flow based on the user input 220 to the embedded flow application in the cloud-based collaboration application. For example, the application server 205 hosting the cloud-based collaboration application may receive updates to the data processing flow within the cloud-based collaboration application from multiple users (not shown) collaborating on the cloud-based collaboration application concurrently. The application server 205 may modify the instance of the data processing flow based on the user input 220 to the embedded flow application in the cloud-based collaboration application. For example, the application server 205 hosting the cloud-based document application may modify the embedded instance of the data processing flow based on the user input 220 received in the cloud-based collaboration application displayed on the user device 215. The application server 205 may modify the embedded instance of the data processing flow to generate a second instance of the data processing flow. In some cases, the second instance of the data processing flow may include a second sequence of data processes different from the first sequence of data processes included in the first instance of the data processing flow (such as a new data processing flow or an existing data processing flow loaded from the source device 210). The second sequence may include different elements, connectors, resources, or a combination thereof than the first sequence.

In some examples, the application server 205 may synchronize the modified instance of the data processing flow with the data processing flow stored in the source device 210. That is, the application server 205 may transmit the modified instance of the data processing flow 230 to the source device 210. As the application server 205 supports real-time updating at the user device 215, the user device 215 may automatically display the latest modified instance of the data processing flow according to the cloud-based version of the application. However, the synchronization process may allow for the flow application (which may not support real-time editing by multiple user devices 215) to match the modified instance of the data processing flow 235 modified by multiple users and displayed at the user device 215. In some examples, the application server 205 may update the flow application with the modified instance of the data processing flow 230 in response to an input from a user. As such, once the instance of the data processing flow is ready for deployment, a user may select to synchronize the data processing flow with the underlying flow application (such as the flow application running on or hosted at the source device 210). Using the processes described herein, the system 200 may integrate the creation of data processing flows into a real-time collaboration application (for example, a cloud-based document application).

Figure 3:
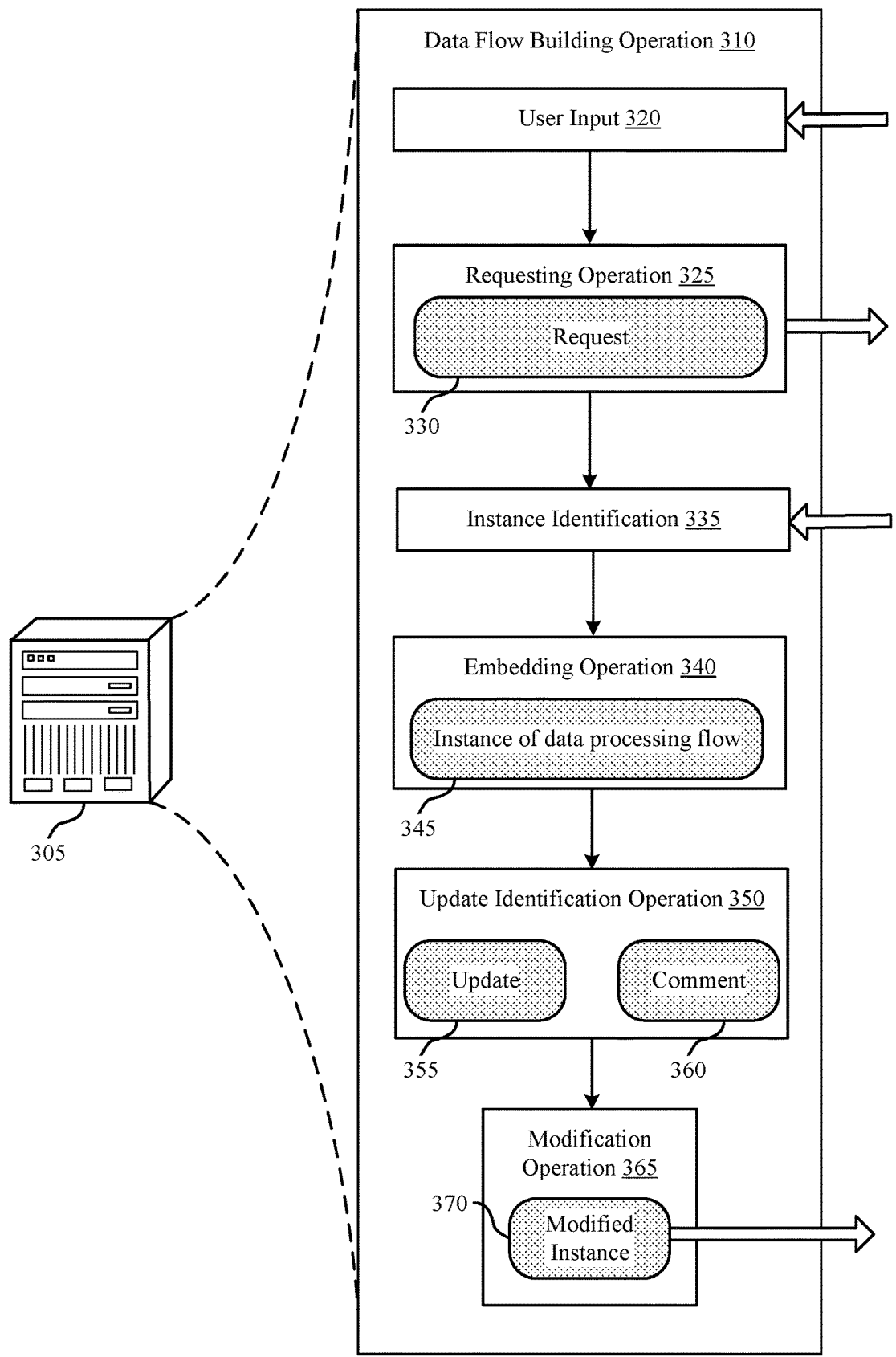
FIG. 3 illustrates an example of a collaboration procedure that supports building collaborative data processing flows in accordance with aspects of the present disclosure.

FIG. 3 illustrates an example of a collaboration procedure 300 that supports building collaborative data processing flows in accordance with aspects of the present disclosure. The collaboration procedure 300 may be performed by a device 305, such as a server (e.g., an application server, a cloud-based server, a database server, a server cluster, a virtual machine, a container, a component of another device, etc.). Although not shown in FIG. 3, the collaboration procedure 300 may be performed by a user device, a source device, a data store, or some combination of these or similar devices. In some cases, the device 305 may be a component of a subsystem 125 as described with reference to FIG. 1. The device 305 may perform data flow building operation 310 to integrate the creation and modification of data processing flows into a cloud-based collaboration application (such as, a cloud-based document application). For example, using a number of techniques, the device 305 may provide a collaborative environment in which two or more users can simultaneously view and modify a data processing flow in real-time (or pseudo-real-time). In some cases, a device 305 may implement all of the techniques described herein to perform the data flow building operation 310, while in other cases, the device 305 may implement a subset of the described techniques or may implement additional techniques to support the data flow building operation 310.

The process of building data processing flows may be complex. A flow application (for building data processing flows) may be used for implementing a sequence of data processes, business activities, or tasks that involve leveraging capabilities included in one or more applications. In some cases, a user may be able to create a data processing flow that can retrieve, create, update, and/or display data based on information in one or more applications connected using the data processing flow. Specifically, data processing flows (e.g., enterprise flows) may be used to automate data processes (e.g., business processes) configured to perform business operations. According to an example CRM system, a flow building application may be used for a client that registers an account. In some cases, the flow building application may automatically send an email including a link to log on to the CRM system. That is, a flow building application may be used as a logical connector (e.g., by using a node name, a variable name, and a variable value). In some cases, the flow building application may be used to customize screens based on a trigger (such as a variable). To handle more complex business operations (e.g., including multiple data sources, applications, logical tests, etc.), it may be important to accurately create and maintain the data processing flows. Some systems may provide an interface for building the data processing flows and tools for reducing errors in the data processing flows. However, some such systems may lack functionality to support real-time collaboration when designing data processing flows. Specifically, these systems may not provide functionality for two or more users to simultaneously work on creating or updating a data processing flow. Additionally, these systems may not provide an opportunity for a user to leave comments, correct mistakes, or share the data processing flow at design time.

In contrast, the device 305 may support accurate, real-time flow collaboration. Specifically, the device 305 may support data flow building operation 310 by integrating the creation of data processing flows into a cloud-based real-time collaboration application (for example, a cloud-based document application, such as Quip). For example, the device 305 (such as an application server) may host the cloud-based document application and may embed a flow application in the cloud-based application. According to one or more aspects of the present disclosure, the device 305 may receive a user input 320 to the cloud-based collaboration application (e.g., a cloud-based document application). The device 305 may receive the user input 320 from one or more users (e.g., in a user interface, such as a web interface of a user device). As one example, the device 305 may host the cloud-based document application and may transmit the cloud-based document application for display on one or more user devices (not shown) in real-time (or pseudo-real-time). The user devices may each include an interactive interface within which the cloud-based collaborative application may be displayed. In some cases, the interactive interface may run as a webpage within a web browser hosted at a user device. Each user may log on to the cloud-based collaborative application using a user ID. In some cases, multiple users may concurrently view and interact with the cloud-based document application (i.e., multiple users may be logged on to the same cloud-based document application). As depicted herein, the device 305 may receive user input 320 including a request to create or load an instance of a data processing flow in the cloud-based document application.

The device 305 may perform a requesting operation 325 in response to receiving the user input 320. For example, the device 305 may transmit a request 330 for an instance of a data processing flow based on receiving the user input 320. In some examples, the device 305 may transmit the request 330 to a source device (not depicted herein). In one example, the source device may be a different server, a different component of the device 305, or a user device hosting a flow building application. According to one or more aspects, the device 305 may perform an instance identification operation 335. For example, the device 305 may receive an instance of the data processing flow for a flow application from a source device. As previously described, the instance of the data processing flow may be based on the user input 320 to the cloud-based collaboration application. In one example, the instance of the data processing flow may include a first sequence of data processes. The sequence of data processes may include one or more elements (e.g., one or more actions to execute, such as read, write, display, collect, modify, etc.), one or more connectors (e.g., one or more paths for the executing the actions at runtime), one or more resources, one or more values associated with the data processing flow (e.g., values to be referenced throughout the data processing flow), or a combination thereof. Although not depicted herein, the source device may receive the request for the instance of the data processing flow from the device 305 and may transmit the instance of the data processing flow in response to receiving the request.

The device 305, upon receiving the instance of the data processing flow, may perform an embedding operation 340. Specifically, the device 305 may retrieve an instance of the requested data processing flow from a flow application hosted on the source device and may embed the instance of the data processing flow 345 into the cloud-based document application (i.e., the cloud-based document application hosted by the device 305). In some examples, the device 305 may perform the embedding operation 340 by creating and/or displaying the instance of the data processing flow 345 in a user interface for the cloud-based document application. By embedding the instance of the data processing flow 345 in the cloud-based collaboration application, the device 305 may provide for real-time collaboration on the data processing flow by the users accessing the cloud-based collaboration application (e.g., a cloud-based document application).

According to one or more aspects, the device 305 may receive one or more user inputs to the embedded flow application in the cloud-based collaboration application. For example, the users (e.g., users collaborating on the cloud-based document application) may update the data processing flow and/or comment on the data processing flow (e.g., by writing comments in a cloud-based document containing the embedded instance of the data processing flow 345). The device 305 may perform an update identification operation 350 in response to receiving the user inputs. According to one or more aspects, the device 305 may identify an update 355 to the data processing flow based on the one or more user inputs to the embedded flow application in the cloud-based collaboration application. Additionally or alternatively, the device 305 may identify a comment 360 associated with the data processing flow based on the one or more user inputs to the cloud-based collaboration application. Thus, the present disclosure provides for a method for a first user to comment on different parts of the data processing flow, assign tasks to a second user using the cloud-based collaboration application, track progress of the data processing flow, or a combination thereof.

Upon identifying the update to the data processing flow, the device 305 may perform a modification operation 365 to generate a modified instance 370 of the data processing flow. The modified instance of the data processing flow may include a second sequence of data processes different from the first sequence of data processes (i.e., the sequence of data processes associated with the instance of the data processing flow received form the source device). For example, the device 305 may modify the instance of the data processing flow based on the update included in the one or more user inputs to the embedded flow application in the cloud-based collaboration application. This modified instance 370 of the data processing flow may automatically be displayed at the user devices accessing the cloud-based collaboration application, such that each user operating one of the user devices may view the modifications made by each other user (e.g., in real-time or pseudo-real-time). Thus, the present disclosure provides for a method for a first user to identify an error made by a second user at design time (e.g., without deploying the data processing flow or synchronizing the data processing flow in the flow application) and correct the error.

In some examples, the device 305 may transmit the modified instance 370 of the data processing flow to the source device (i.e., the device hosting the flow application). In some cases, the device 305 may transmit the modified instance 370 of the data processing flow based on a user input (not shown). That is, once the instance of the data processing flow is modified (e.g., the instance of the data processing flow is ready for deployment), a user may select to synchronize the modified instance of the data processing flow with the underlying flow application (i.e., the flow application hosted at the source device). In other cases, the cloud-based collaboration application may automatically synchronize the data processing flow in the flow application based on a synchronization schedule or periodicity. The device 305 may push the modified instance 370 of the data processing flow to the flow application running on the source device, and the source device may replace the saved instance of the data processing flow (i.e., the previous instance of the data processing flow) with the modified instance 370 of the data processing flow.

According to one or more aspects, the device 305 may share the modified instance 370 of the data processing flow to one or more user devices. In one example, the device 305 may share the modified instance 370 of the data processing flow via a link associated with the document containing the embedded data processing flow. For example, based on a user input, the device 305 may send a copy of the URL for the cloud-based document containing the embedded data processing flow to a user device (e.g., in an email). A user operating the user device may access the cloud-based document (and, correspondingly, the data processing flow) by clicking on the link. In some examples, the device 305 may also embed multiple data processing flows in the same cloud-based collaboration application (e.g., a cloud-based document application). In such an example, multiple users (i.e., users collaborating the cloud-based document application) may be able to simultaneously update the multiple data processing flows in real-time in a single interface. Additionally or alternatively, updates to one data processing flow in the cloud-based collaboration application may result in updates to one or more other data processing flows in the cloud-based collaboration application. For example, if two data processing flows embedded in the same collaborative document use a same element or resource, updating the element or resource in one data processing flow may automatically update the element or resource in the other data processing flow (e.g., if the flows or some components of the flows are associated within the collaborative document).

Figure 4:
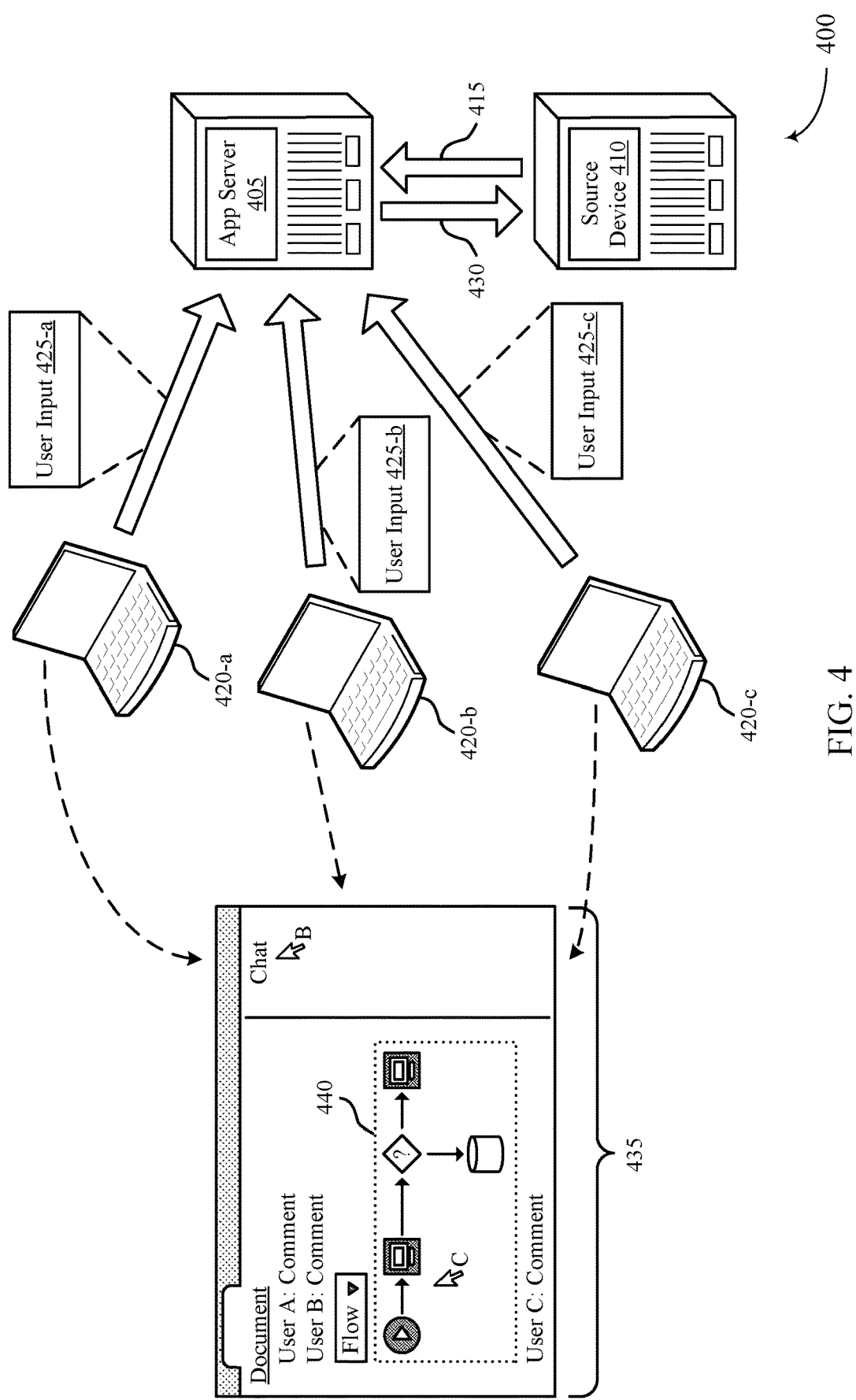
FIG. 4 illustrates an example of a system including multiple users that supports building collaborative data processing flows in accordance with aspects of the present disclosure.

FIG. 4 illustrates an example of a system 400 including multiple users that supports building collaborative data processing flows in accordance with aspects of the present disclosure. The system 400 may include an application server 405 (e.g., an application server 205 as described with reference to FIG. 2, a device 305 as described with reference to FIG. 3, etc.), a source device 410 (e.g., a source device 210 as described with reference to FIG. 2), user device 420-*a*, user device 420-*b*, and user device 420-*c*. In some cases, the functions performed by the application server 405 may instead be performed by a component of the source device 410, or one or more of the user devices 420. The user devices 420 may support an application for collaborative data processing flow design. Specifically, the user devices 420 in combination with the application server 405 may support an application that provides for building collaborative data processing flows.

According to one or more aspects of the present disclosure, the application server 405 may integrate the creation of data processing flows into a cloud-based collaboration application (such as, a real-time collaboration application or a cloud-based document application). For example, one or more aspects of the present disclosure provides for integration of creation and modification of data processing flows into a cloud-based document application. In some cases, the application server 405 may host the cloud-based document application. The application server 405 may transmit the cloud-based document application for display on multiple user devices 420. In some cases, the application server 405 may determine that multiple users are simultaneously accessing the cloud-based document application (via user devices 420). Each user device 420 may display a collaborative environment in a user interface 435, where modifications by a first user device 420-*a* are displayed in the user interfaces 435 for the other user devices 420 (in addition to the first user device 420-*a*). The collaborative environment displayed in the user interfaces 435 for the user devices 420 may include a collaborative document, a chat window, a live update portion (e.g., indicating a history of edits made to the document), a menu, or some combination of these or other components. The collaborative environment may support any number of users or user devices 420 concurrently accessing the environment.

According to some aspects, the application server 405 may receive a request to create or load an instance of a data processing flow. In one example, the application server 405 may receive the request included in one or more user inputs 425 (such as user inputs 425-*a*, 425-*b*, or 425-*c*). That is, at least one user operating at least one of the user devices 420 may input a request to create or load an instance of a data processing flow within the cloud-based collaboration application (such as within a collaborative document). The user devices 420 may each include an interactive interface (i.e., the user interface 435) for displaying the cloud-based collaborative application. In some cases, the cloud-based collaborative application may run as a webpage within a web browser hosted at a user device 420.

Upon receiving the request (via user inputs 425), the application server 405 may transmit a request 430 for the instance of the data processing flow to the source device 410. The source device 410 may host a flow application (e.g., a flow builder, a CRM application in which the data processing flows may run, etc.) associated with the instance of the data processing flow. In one example, the request 430 for the instance of the data processing flow for the flow application may be based on a first user input 425 to the cloud-based collaboration application. In some cases, the application server 405 may receive the instance of the data processing flow 415 for the flow application from the source device 410. The application server 405 may embed the flow application in the cloud-based collaboration application based on receiving the instance of the data processing flow. For example, the application server 405 may embed an interactive data processing flow 440 within the collaborative document. The interactive data processing flow 440 may be displayed on the user devices 420 in the user interface 435. That is, the application server 405 may be configured to display the instance of the data processing flow to the users accessing the cloud-based document application (i.e., the users simultaneously editing a document in the cloud-based document application). In some examples, if a first user requests the creation of an instance of the data processing flow within a cloud-based document application, the application server 405 may embed the instance of the data processing flow within the cloud-based document application and may display the interactive data processing flow 440 to the users collaborating on the cloud-based document application. With this approach, the users may have the ability to collaborate on the data processing flow at design time.

For example, each user may select to modify the interactive data processing flow 440 or the collaborative document. If a first user operating user device 420-*a* updates the collaborative document (e.g., by writing a comment) or the interactive data processing flow 440 (e.g., by adding an element, changing a connection or logical step, etc.), the updates may be reflected in the collaborative document and/or the interactive data processing flow 440 displayed in the user interfaces 435 for the other user devices 420 (e.g., user devices 420-*b* and 420-*c*) accessing the collaborative document. In some cases, the interactive data processing flow 440 may run the flow application within the collaborative document. For example, the flow application may be hosted within the collaborative document using one or more frameworks. In some other cases, a version of the flow application designed for the collaborative document may run in the collaborative document and support the interactive data processing flow 440. This version may include all or a subset of the functionality provided by the flow application at the source device 410 (e.g., a flow application not supporting real-time collaboration). For example, this version may support a suite of real-time collaboration actions in the collaborative document (i.e., the cloud-based document application). In some cases, a JavaScript framework compatible with the cloud-based document application (e.g., in conjunction with one or more application programming interfaces (APIs), plugins, containers, libraries, etc.) may support designing, publishing, and embedding a version of the flow application within the cloud-based document application (e.g., as a single page application within a live application structure). This may support users viewing, customizing, and publishing data processing flows within the cloud-based document application (e.g., using the interactive data processing flow 440) without using the underlying flow application. By synchronizing the interactive data processing flow 440 to the underlying flow application, the system 400 may support a user logging into the underlying flow application and viewing the data processing flow as updated in the cloud-based document application. The user may further modify the data processing flow in this flow application (e.g., in a non-real-time, non-collaborative manner).

In a specific example, the application server 405 may receive a request for modifying the instance of the data processing flow embedded within the cloud-based collaboration application. For example, after receiving an instance of the data processing flow embedded within the cloud-based collaboration application, a second user (i.e., a second user collaborating on the cloud-based collaboration application) may request a modification to the instance of the data processing flow. In some cases, the application server 405 may receive a request to create the data processing flow via a first user input 425-*a* (e.g., based on the first user selecting a flow to embed in the collaborative document) and a request to modify the instance of the data processing flow via a second user input 425-*b* (e.g., based on the second user interacting with the interactive data processing flow 440). In one example, the request to modify the instance of the data processing flow may include a request for revising, updating, or deleting certain aspects of the data processing flow. That is, a user may drag-and-drop a new element or connection into the interactive data processing flow 440, select an element or connection within the interactive data processing flow 440 and change one or more parameters (e.g., in a popup window), delete an element or connection from the interactive data processing flow 440, or perform any combination of these modifications. In some cases, the request to modify the instance of the data processing flow may include a comment associated with the data processing flow. For example, a user may input a comment associated with the data processing flow via a user input 425. The application server 405 may modify the instance of the data processing flow embedded within the cloud-based collaboration application based on receiving the request for modification (via user inputs 425), where these modifications are visible to all user devices 420 accessing the cloud-based collaboration application. Thus, the present disclosure provides for methods where a first user may request (via user input 425-*a*) to create an instance of a data processing flow within a cloud-based collaboration application (e.g., a cloud-based document application), a second user may modify the data processing flow (via user input 425-*b*) using the interactive data processing flow 440, and a third user may comment on different parts of the data processing flow (via user input 425-*c*) in the cloud-based collaboration application.

In some implementations, a first user (e.g., a user collaborating on the cloud-based collaboration application) may be able to assign tasks to a second user collaborating on the cloud-based collaboration application. As depicted in the example of FIG. 4, a first user may assign a task to second user by inputting the task into the collaborative environment displayed in the shared user interface 435 using user device 420-*a*. In some cases, upon modification of the data processing flow, the modified instance of the data processing flow is created within the real-time collaboration application, and the application server 405 may transmit the modified instance of the data processing flow to the source device 410. In some cases, sending the data processing flow to the source device 410 may involve debugging the data processing flow, passing the data processing flow through an API to support compatibility with the flow application, or some combination of these processes. Additionally or alternatively, one or more aspects of the present disclosure may provide for sharing the modified instance of the data processing flow via emails, workplace collaboration sites, knowledge articles, community threads, etc.

Figure 5:
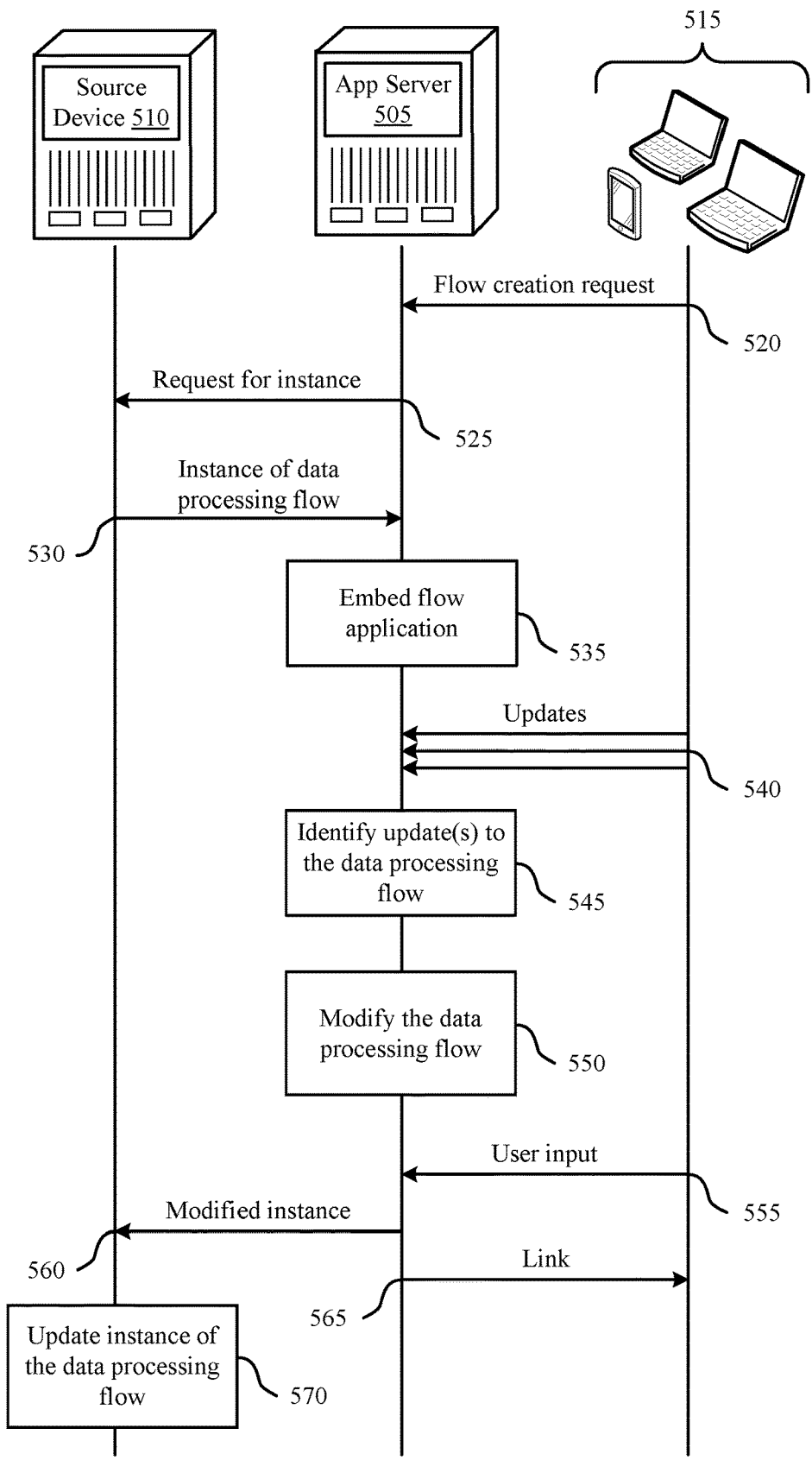
FIG. 5 illustrates an example of a process flow that supports building collaborative data processing flows in accordance with aspects of the present disclosure.

FIG. 5 illustrates an example of a process flow 500 that supports building collaborative data processing flows in accordance with aspects of the present disclosure. The process flow 500 may involve an application server 505 or some other device for hosting a cloud-based application (for example, a cloud-based document application, such as Quip), a source device 510, and user devices 515, which may be examples of the corresponding devices described with reference to FIGS. 1 through 4. Although depicted as a server, it may be understood that the source device may be a user device. In some cases, some or all of the functionality of the application server 505 may be performed by components of the source device 510 or the user devices 515. The application server 505 may implement a number of techniques to build and process collaborative data processing flows. Alternative examples of the following may be implemented, where some steps are performed in a different order than described or are not performed at all. In some cases, steps may include additional features not mentioned below, or further steps may be added.

The application server 505 may host a cloud-based collaboration application. In some cases, the cloud-based collaboration application may include a cloud-based document application (i.e., a cloud-based application which can be simultaneously viewed and modified by multiple users). At 520, a user may utilize a user device 515 to transmit a flow creation request or flow loading request. For example, the user may select a flow creation request button or trigger or select a particular data processing flow to load in a user interface displaying the cloud-based collaboration application. The application server 505 hosting the cloud-based document application may receive a user input (such as a user input including a flow creation request or flow loading request) to the cloud-based collaboration application.

The application server 505 may determine that the user input includes a request to create a new instance of a data processing flow or load an instance of a data processing flow for a flow application. Upon receiving the request, the application server 505 may identify the flow application associated with the data processing flow. In some cases, at 525, the application server 505 may transmit a request for an instance of the data processing flow from the flow application hosted at the source device 510. According to one or more aspects, the application server 505 may transmit the request based on receiving the request from the user device 515. In a first example, the source device 510 may identify the data processing flow in the flow application. In a second example, the source device 510 may create a data processing flow based on the request. In a third example, the application server 505 may create the data processing flow based on the request (e.g., without interacting with the underlying flow application at the source device 510). In some cases, the instance of the data processing flow may include a first sequence of data processes. In one example, the sequence of data processes may include one or more elements, one or more connectors, one or more resources, one or more values associated with the data processing flow, or a combination thereof.

At 530, the application server 505 may receive an instance of the data processing flow for the flow application from the source device 510. In some cases, the application server 505 may receive the instance of the data processing flow in response to the request transmitted at 525. That is, the application server 505 may receive the instance of the data processing flow for the flow application based on a user input to the cloud-based collaboration application hosted by the application server 505. In some cases, the instance of the data processing flow include the first sequence of data processes.

At 535, the application server 505 may embed the flow application in the cloud-based collaboration application based on receiving the instance of the data processing flow at 530. For example, the application server 505 hosting a cloud-based document may retrieve an instance of the requested data processing flow from the flow application on the source device 510. The application server 505 may then create and/or display the retrieved data processing flow in a user interface for the cloud-based document application. In some examples, the application server 505 may also embed one or more modification tools associated with the data processing flow.

At 540, the application server 505 may receive at least one user input to the embedded flow application in the cloud-based collaboration application. In some examples, the user input may include an update to the data processing flow. Additionally or alternatively, the user input may include a comment associated with the data processing flow in the embedded flow application. Based on embedding the flow application in the cloud-based collaboration application, multiple users collaborating on the cloud-based collaboration application may update the data processing flow.

At 545, the application server 505 may identify the update(s) to the data processing flow based on the user inputs to the embedded flow application in the cloud-based collaboration application (i.e., the user inputs received at 540). For example, the application server 505 may receive one or more updates to the data processing flow within the cloud-based collaboration application from multiple users collaborating on the cloud-based collaboration application. As previously discussed, in some cases, the application server 505 may identify a comment associated with the data processing flow based on the user input to the embedded flow application received at 540.

At 550, the application server 505 may modify the instance of the data processing flow based on the user inputs (i.e., the user inputs received at 540) to the embedded flow application in the cloud-based collaboration application. In one example, the application server 505 may modify the instance of the data processing flow based on identifying the update to the data processing flow. In some cases, the application server 505 may modify the instance of the data processing flow to include the comment received via the user input at 540. The application server 505 may display the modifications to the instance of the data processing flow in real-time within the cloud-based collaboration application. That is, the application server 505 may transmit, to at least a first user device and a second user device, the modified instance of the data processing flow. This may allow the users operating the user devices 515 to view any updates made by other users accessing the same shared cloud-based document.

At 555, the application server 505 may receive a user input to the cloud-based collaboration application. In some cases, upon receiving the user input (e.g., a synchronization request), at 560, the application server 505 may transmit the modified instance of the data processing flow to the source device 510. In some other cases, upon receiving the user input (e.g., a sharing request), at 565, the application server 505 may transmit, to another user device 515, a link of the cloud-based collaboration application (i.e., a link to a specific cloud-based document using the document's URL) to access the modified instance of the data processing flow.

At 570, the source device 510 may update the data processing flow from the first instance to a modified instance in the flow application hosted at the source device 510 based on receiving the modified instance from the application server 505. In some cases, the modified instance of the data processing flow may include a second sequence of data processes different from the first sequence of data processes. This updating may synchronize the version of the data processing flow in the flow application with the version of the data processing flow in the cloud-based collaboration application.

Figure 6:
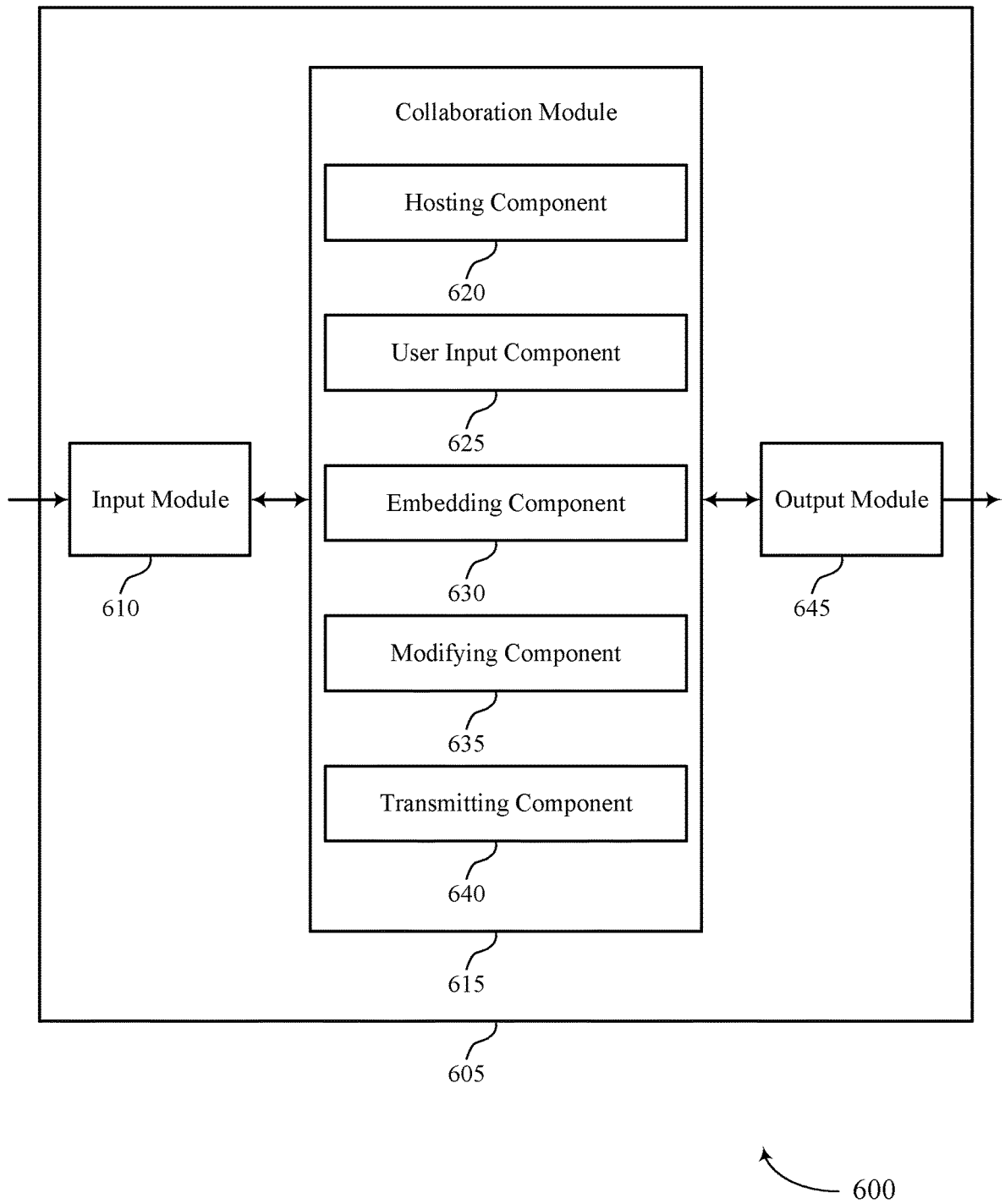
FIG. 6 shows a block diagram of an apparatus that supports building collaborative data processing flows in accordance with aspects of the present disclosure.

FIG. 6 shows a block diagram 600 of an apparatus 605 that supports building collaborative data processing flows in accordance with aspects of the present disclosure. The apparatus 605 may include an input module 610, a collaboration module 615, and an output module 645. The apparatus 605 may also include a processor. Each of these components may be in communication with one another (e.g., via one or more buses). In some cases, the apparatus 605 may be an example of a user terminal, a server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to collaboration module 615 to support building collaborative data processing flows. In some cases, the input module 610 may be a component of an input/output (I/O) controller 815 as described with reference to FIG. 8.

The collaboration module 615 may include a hosting component 620, a user input component 625, an embedding component 630, a modifying component 635, and a transmitting component 640. The collaboration module 615 may be an example of aspects of the collaboration module 705 or 810 described with reference to FIGS. 7 and 8.

The collaboration module 615 and/or at least some of its various sub-components may be implemented in hardware, software executed by a processor, firmware, or any combination thereof. If implemented in software executed by a processor, the functions of the collaboration module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The collaboration module 615 and/or at least some of its various sub-components may be physically located at various positions, including being distributed such that portions of functions are implemented at different physical locations by one or more physical devices. In some examples, the collaboration module 615 and/or at least some of its various sub-components may be a separate and distinct component in accordance with various aspects of the present disclosure. In other examples, the collaboration module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The apparatus 605 may be an example of or a component of an application server (e.g., an application server managing a data processing flow). The hosting component 620 may host, at the application server, a cloud-based collaboration application. The user input component 625 may receive, from a source device, an instance of a data processing flow for a flow application based on a first user input to the cloud-based collaboration application, where the instance of the data processing flow includes a sequence of data processes. The embedding component 630 may embed the flow application in the cloud-based collaboration application based on receiving the instance of the data processing flow. The modifying component 635 may modify the instance of the data processing flow based on a set of user inputs to the embedded flow application in the cloud-based collaboration application from multiple users. The transmitting component 640 may transmit, to the source device, the modified instance of the data processing flow based on a second user input to the cloud-based collaboration application.

The output module 645 may manage output signals for the apparatus 605. For example, the output module 645 may receive signals from other components of the apparatus 605, such as the collaboration module 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
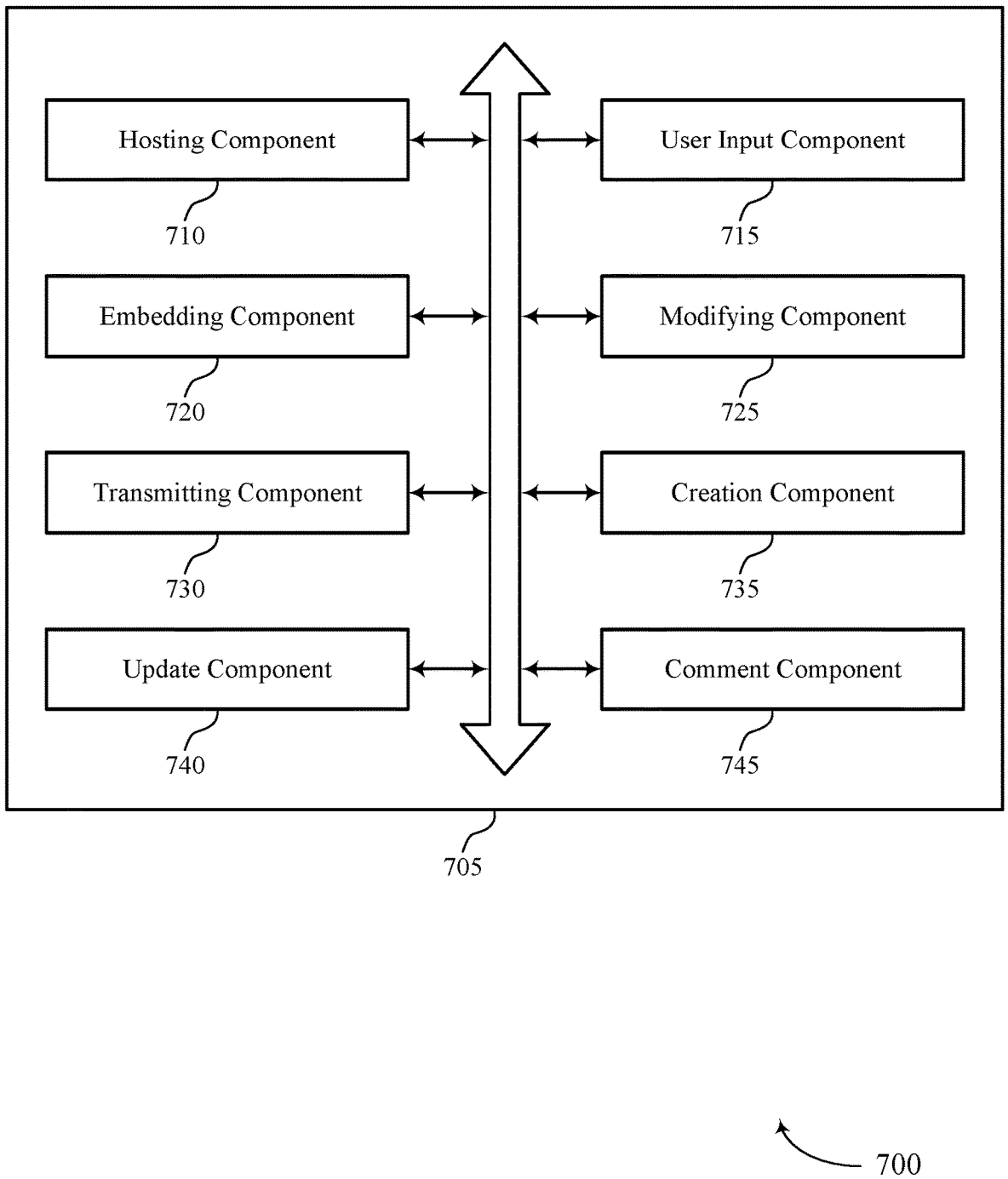
FIG. 7 shows a block diagram of a collaboration module that supports building collaborative data processing flows in accordance with aspects of the present disclosure.

FIG. 7 shows a block diagram 700 of a collaboration module 705 that supports building collaborative data processing flows in accordance with aspects of the present disclosure. The collaboration module 705 may be an example of aspects of a collaboration module 615 or a collaboration module 810 described herein. The collaboration module 705 may include a hosting component 710, a user input component 715, an embedding component 720, a modifying component 725, a transmitting component 730, a creation component 735, an update component 740, and a comment component 745. Each of these modules may communicate, directly or indirectly, with one another (e.g., via one or more buses). The collaboration module 705 may be implemented at an application server (e.g., a single server, a server cluster, a virtual machine, a container, or some other processing device or system). In some cases, the application server may be referred to as a cloud or cloud-based server.

The hosting component 710 may host, at the application server, a cloud-based collaboration application. In some cases, the cloud-based collaboration application is a cloud-based collaborative document application. The user input component 715 may receive, from a source device, an instance of the data processing flow for a flow application based on a first user input to the cloud-based collaboration application, where the instance of the data processing flow includes a sequence of data processes. The embedding component 720 may embed the flow application in the cloud-based collaboration application based on receiving the instance of the data processing flow. The modifying component 725 may modify the instance of the data processing flow based on a set of user inputs to the embedded flow application in the cloud-based collaboration application from a set of users. The transmitting component 730 may transmit, to the source device, the modified instance of the data processing flow based on a second user input to the cloud-based collaboration application.

In some examples, the user input component 715 may receive the first user input to the cloud-based collaboration application. In some examples, the transmitting component 730 may transmit, to the source device, a request for the instance of the data processing flow based on receiving the first user input, where receiving the instance of the data processing flow is based on transmitting the request. In some cases, the first user input includes a request to embed the instance of the data processing flow for the flow application in the cloud-based collaboration application. In some cases, the instance of the data processing flow is created at the source device.

In some examples, the user input component 715 may receive a third user input to the cloud-based collaboration application, the third user input including a request to create a new instance of a second data processing flow for the flow application. The creation component 735 may create the new instance of the second data processing flow based on receiving the third user input and embedding the flow application in the cloud-based collaboration application.

The update component 740 may identify an update to the data processing flow based on the set of user inputs to the embedded flow application in the cloud-based collaboration application, where the instance of the data processing flow is modified based on the update to the data processing flow. In some examples, the transmitting component 730 may transmit, to at least a first user device and a second user device, the modified instance of the data processing flow for display.

In some examples, the transmitting component 730 may transmit, to at least a first user device and a second user device, a link of the cloud-based collaboration application (e.g., the document's URL) to access the modified instance of the data processing flow. In some cases, the modified instance of the data processing flow includes a second sequence of data processes different from the sequence of data processes.

In some examples, the user input component 715 may receive at least one of the set of user inputs to the embedded flow application in the cloud-based collaboration application. The comment component 745 may identify a comment associated with the data processing flow based on receiving the at least one of the set of user inputs. In some cases, the sequence of data processes includes one or more elements, one or more connectors, one or more resources, one or more values associated with the data processing flow, or a combination thereof.

In some examples, the transmitting component 730 may transmit, to at least a first user device and a second user device, the cloud-based collaboration application for display. In some examples, the user input component 715 may receive the set of user inputs from one or more of the first user device and the second user device.

In some examples, the user input component 715 may receive, from the source device, a second instance of a second data processing flow for the flow application based on a third user input to the cloud-based collaboration application. The modifying component 725 may modify the second instance of the second data processing flow based on the set of user inputs associated with the data processing flow and receiving the second instance of the second data processing flow.

Figure 8:
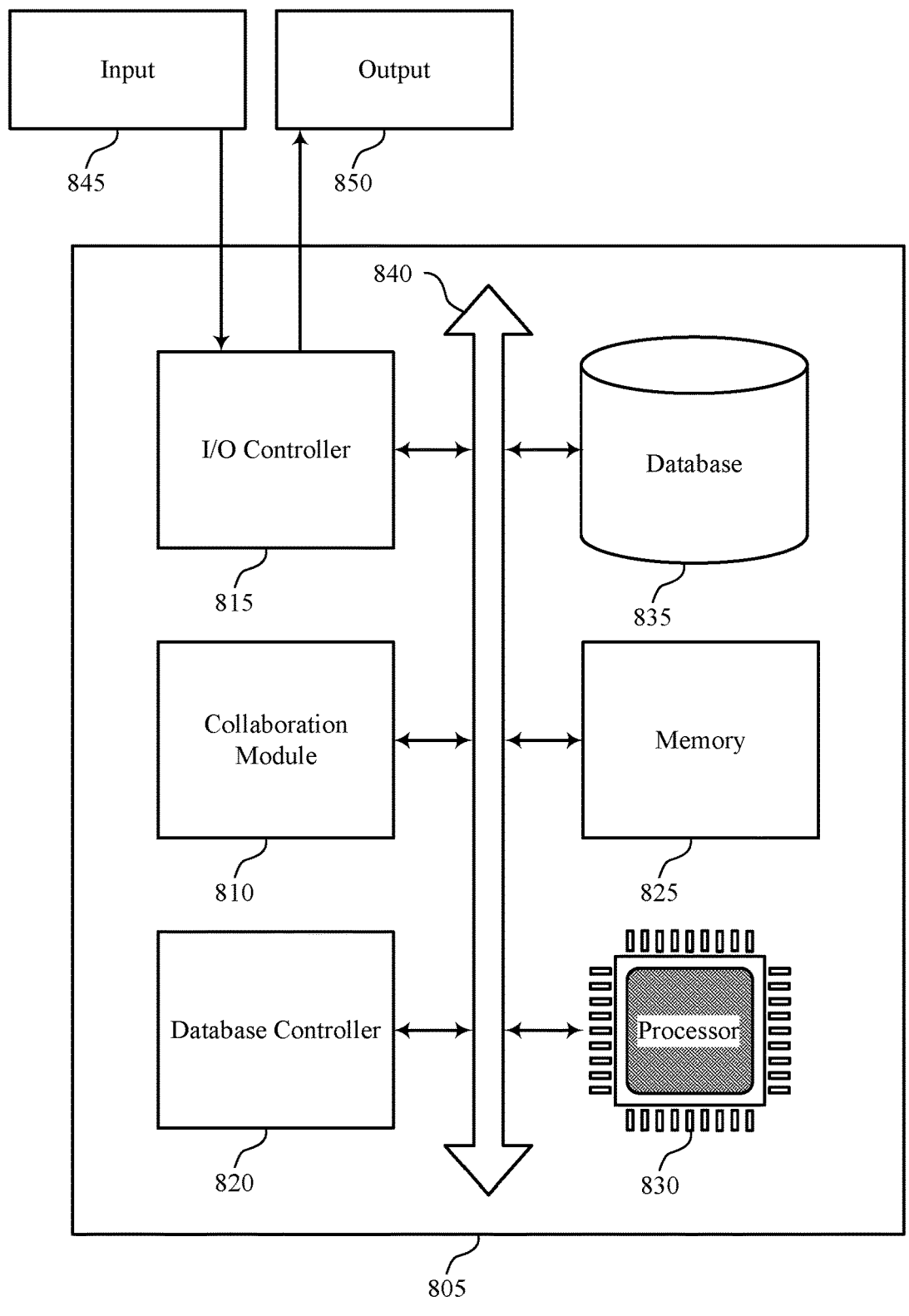
FIG. 8 shows a diagram of a system including a device that supports building collaborative data processing flows in accordance with aspects of the present disclosure.

FIG. 8 shows a diagram of a system 800 including a device 805 that supports building collaborative data processing flows in accordance with aspects of the present disclosure. The device 805 may be an example of or include the components of an application server or an apparatus 605 as described herein. The device 805 may include components for bi-directional data communications including components for transmitting and receiving communications, including a collaboration module 810, an I/O controller 815, a database controller 820, memory 825, a processor 830, and a database 835. These components may be in electronic communication via one or more buses (e.g., bus 840).

The collaboration module 810 may be an example of a collaboration module 615 or 705 as described herein. For example, the collaboration module 810 may perform any of the methods or processes described above with reference to FIGS. 6 and 7. In some cases, the collaboration module 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting building collaborative data processing flows).

Figure 9:
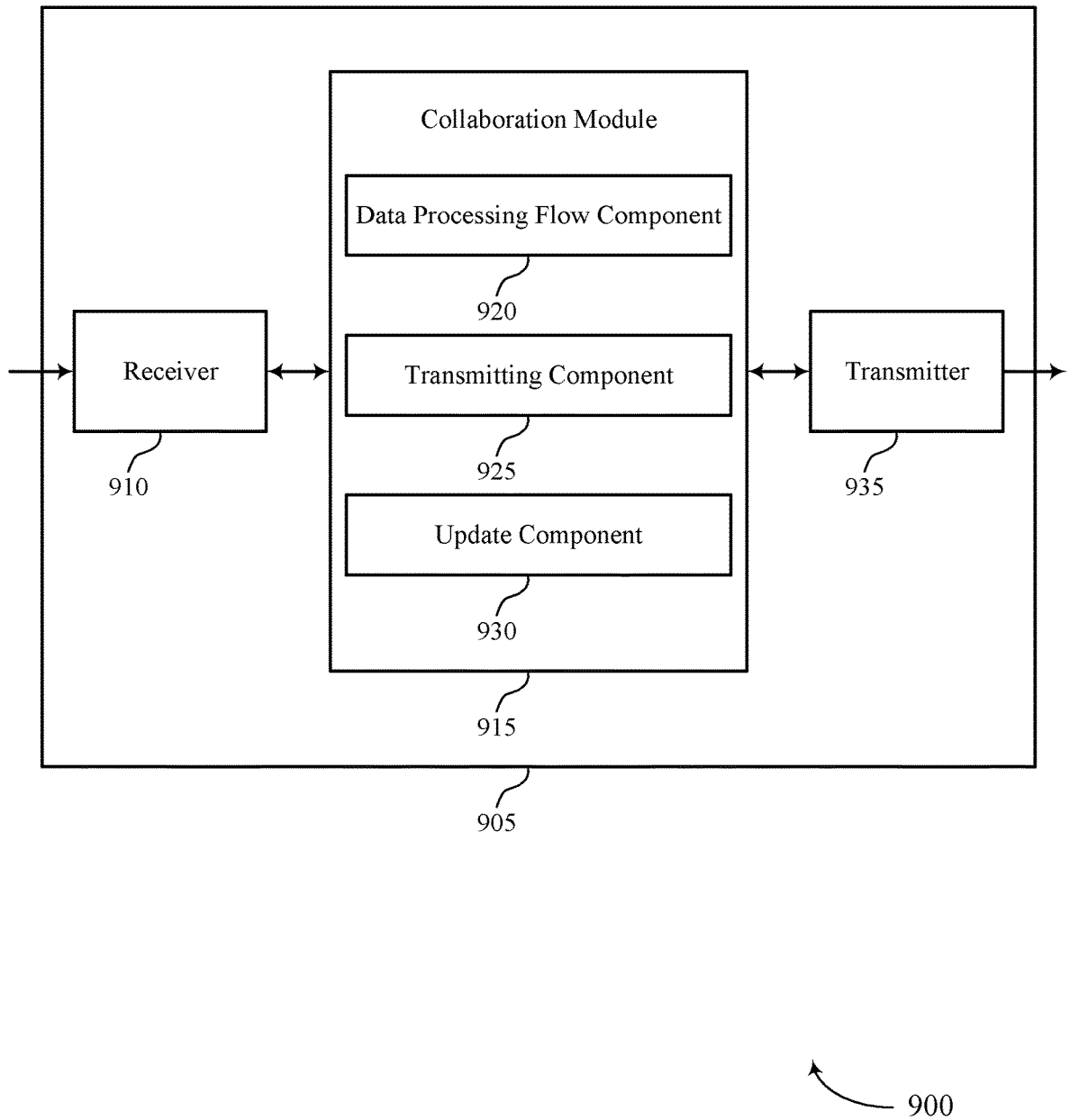
FIG. 9 shows a block diagram of a device that supports building collaborative data processing flows in accordance with aspects of the present disclosure.

FIG. 9 shows a block diagram 900 of a device 905 that supports building collaborative data processing flows in accordance with aspects of the present disclosure. The device 905 may include a receiver 910, a collaboration module 915, and a transmitter 935. The device 905 may also include a processor. Each of these components may be in communication with one another (e.g., via one or more buses). In some cases, the device 905 may be an example of a user terminal, a server, or a system containing multiple computing devices.

The receiver 910 may receive information such as packets, user data, or control information associated with various information channels (e.g., control channels, data channels, and information related to building collaborative data processing flows, etc.). Information may be passed on to other components of the device 905. The receiver 910 may be an example of aspects of the transceiver 1120 described with reference to FIG. 11. The receiver 910 may utilize a single antenna or a set of antennas.

The collaboration module 915 may include a data processing flow component 920, a transmitting component 925, and an update component 930. The collaboration module 915 may be an example of aspects of the collaboration module 1110 described herein. The collaboration module 915 may support managing a data processing flow at a source device. The data processing flow component 920 may receive, from an application server, a request for a first instance of the data processing flow from a flow application hosted at the source device, where the first instance of the data processing flow includes a first sequence of data processes. The transmitting component 925 may transmit, to the application server, the first instance of the data processing flow based on the request. The data processing flow component 920 may further receive, from the application server, a second instance of the data processing flow, where the second instance of the data processing flow is based on the first instance of the data processing flow and a set of user inputs from a set of users, and where the second instance of the data processing flow includes a second sequence of data processes different from the first sequence of data processes. The update component 930 may update the data processing flow from the first instance to the second instance in the flow application hosted at the source device based on receiving the second instance from the application server.

The collaboration module 915 and/or at least some of its various sub-components may be implemented in hardware, software executed by a processor, firmware, or any combination thereof. If implemented in software executed by a processor, the functions of the collaboration module 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The collaboration module 915 and/or at least some of its various sub-components may be physically located at various positions, including being distributed such that portions of functions are implemented at different physical locations by one or more physical devices. In some examples, the collaboration module 915 and/or at least some of its various sub-components may be a separate and distinct component in accordance with various aspects of the present disclosure. In other examples, the collaboration module 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
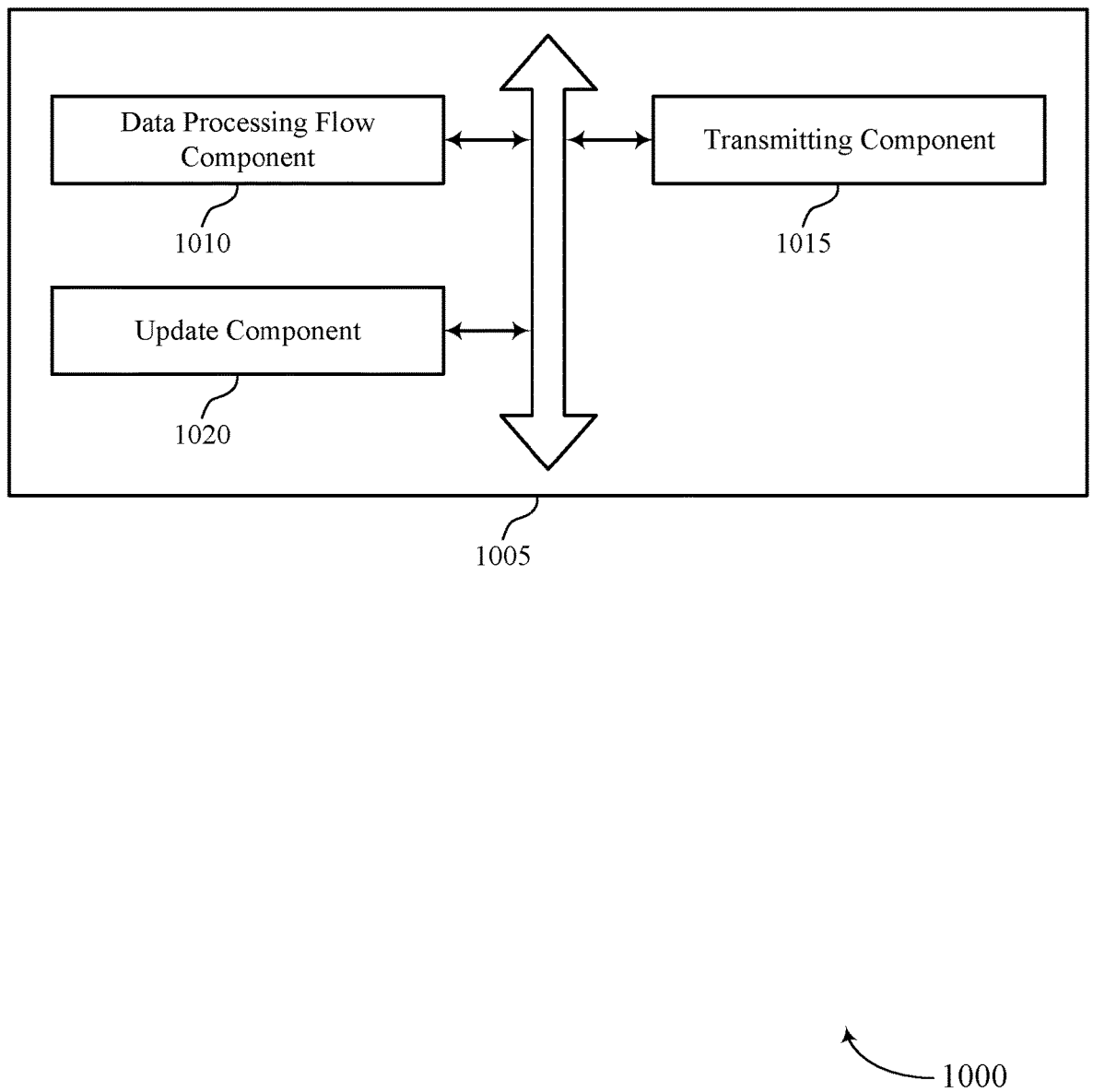
FIG. 10 shows a block diagram of a collaboration module that supports building collaborative data processing flows in accordance with aspects of the present disclosure.

FIG. 10 shows a block diagram 1000 of a collaboration module 1005 that supports building collaborative data processing flows in accordance with aspects of the present disclosure. The collaboration module 1005 may be an example of aspects of a collaboration module 915 or a collaboration module 1110 described herein. The collaboration module 1005 may include a data processing flow component 1010, a transmitting component 1015, and an update component 1020. Each of these modules may communicate, directly or indirectly, with one another (e.g., via one or more buses). The collaboration module 1005 may be implemented at a source device (e.g., a user device, an application server, etc.) to manage a data processing flow.

The data processing flow component 1010 may receive, from an application server, a request for a first instance of the data processing flow from a flow application hosted at the source device, where the first instance of the data processing flow includes a first sequence of data processes. The transmitting component 1015 may transmit, to the application server, the first instance of the data processing flow based on the request. In some examples, the data processing flow component 1010 may receive, from the application server, a second instance of the data processing flow, where the second instance of the data processing flow is based on the first instance of the data processing flow and a set of user inputs from a set of users, and where the second instance of the data processing flow includes a second sequence of data processes different from the first sequence of data processes. The update component 1020 may update the data processing flow from the first instance to the second instance in the flow application hosted at the source device based on receiving the second instance from the application server.

In some examples, the update component 1020 may receive, at the source device, an update to the data processing flow based on a user input to the flow application hosted at the source device. In some examples, the update component 1020 may update the data processing flow in the flow application hosted at the source device based on receiving the update.

In some examples, receiving the second instance of the data processing flow may be based on a user input to a cloud-based collaboration application hosted at the application server. In some cases, the cloud-based collaboration application includes a cloud-based document application.

Figure 11:
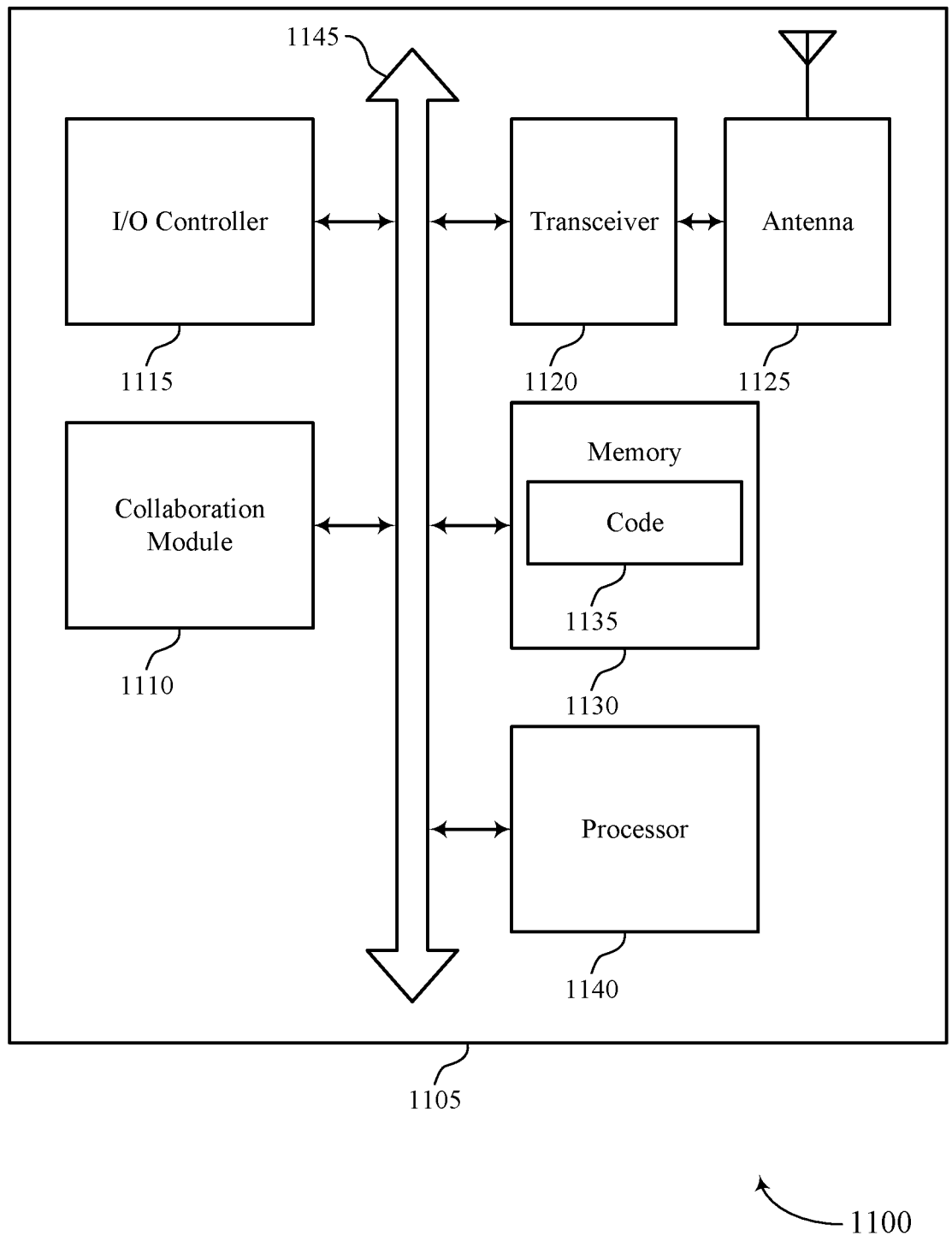
FIG. 11 shows a diagram of a system including a device that supports building collaborative data processing flows in accordance with aspects of the present disclosure.

FIG. 11 shows a diagram of a system 1100 including a device 1105 that supports building collaborative data processing flows in accordance with aspects of the present disclosure. The device 1105 may be an example of or include the components of device 905 as described herein. The device 1105 may include components for bi-directional voice and data communications including components for transmitting and receiving communications, including a collaboration module 1110, an I/O controller 1115, a transceiver 1120, an antenna 1125, memory 1130, and a processor 1140. These components may be in electronic communication via one or more buses (e.g., bus 1145). In some cases, the device 1105 may be an example of a user terminal, a database server, an application server, or a system containing multiple computing devices. In some cases, the device 1105 may be an example of a source device.

The collaboration module 1110 may receive, from an application server, a request for a first instance of a data processing flow from a flow application hosted at the source device, where the first instance of the data processing flow includes a first sequence of data processes, transmit, to the application server, the first instance of the data processing flow based on the request, receive, from the application server, a second instance of the data processing flow, where the second instance of the data processing flow is based on the first instance of the data processing flow and a set of user inputs from a set of users, and where the second instance of the data processing flow includes a second sequence of data processes different from the first sequence of data processes, and update the data processing flow from the first instance to the second instance in the flow application hosted at the source device based on receiving the second instance from the application server.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases the device 1105 may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting building collaborative data processing flows).

The code 1135 may include instructions to implement aspects of the present disclosure, including instructions to support managing a data processing flow. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
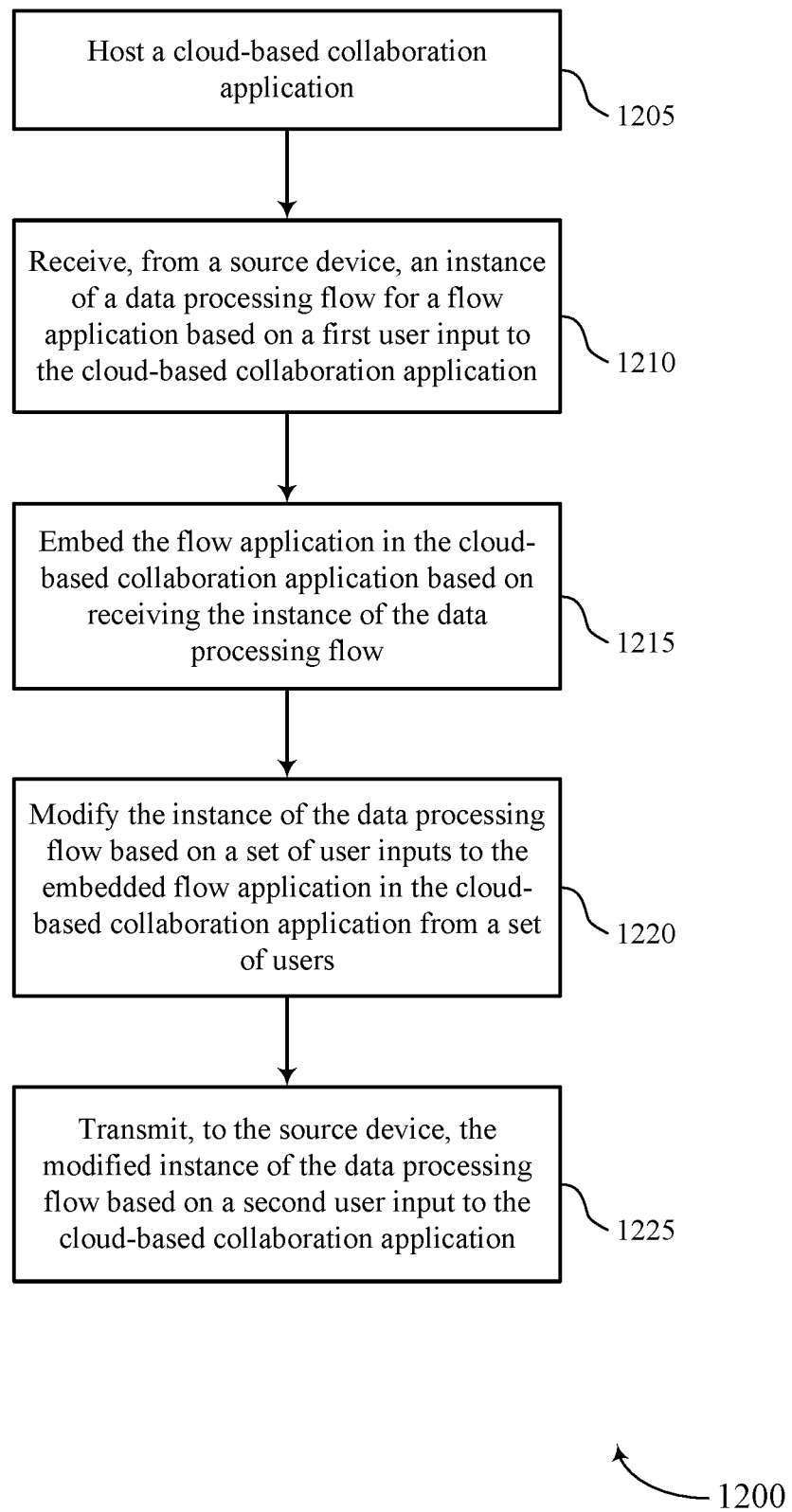
FIGS. 12 through 14 show flowcharts illustrating methods that support building collaborative data processing flows in accordance with aspects of the present disclosure.

FIG. 12 shows a flowchart illustrating a method 1200 that supports building collaborative data processing flows in accordance with aspects of the present disclosure. The operations of method 1200 may be implemented by an application server or its components as described herein. For example, the operations of method 1200 may be performed by a collaboration module as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1205, the application server may host a cloud-based collaboration application. The operations of 1205 may be performed according to the methods described herein. In some examples, aspects of the operations of 1205 may be performed by a hosting component as described with reference to FIGS. 6 through 8.

At 1210, the application server may receive, from a source device, an instance of a data processing flow for a flow application based on a first user input to the cloud-based collaboration application. In some cases, the instance of the data processing flow includes a sequence of data processes. The operations of 1210 may be performed according to the methods described herein. In some examples, aspects of the operations of 1210 may be performed by a user input component as described with reference to FIGS. 6 through 8.

At 1215, the application server may embed the flow application in the cloud-based collaboration application based on receiving the instance of the data processing flow. The operations of 1215 may be performed according to the methods described herein. In some examples, aspects of the operations of 1215 may be performed by an embedding component as described with reference to FIGS. 6 through 8.

At 1220, the application server may modify the instance of the data processing flow based on a set of user inputs to the embedded flow application in the cloud-based collaboration application from a set of users. The operations of 1220 may be performed according to the methods described herein. In some examples, aspects of the operations of 1220 may be performed by a modifying component as described with reference to FIGS. 6 through 8.

At 1225, the application server may transmit, to the source device, the modified instance of the data processing flow based on a second user input to the cloud-based collaboration application. The operations of 1225 may be performed according to the methods described herein. In some examples, aspects of the operations of 1225 may be performed by a transmitting component as described with reference to FIGS. 6 through 8.

Figure 13:
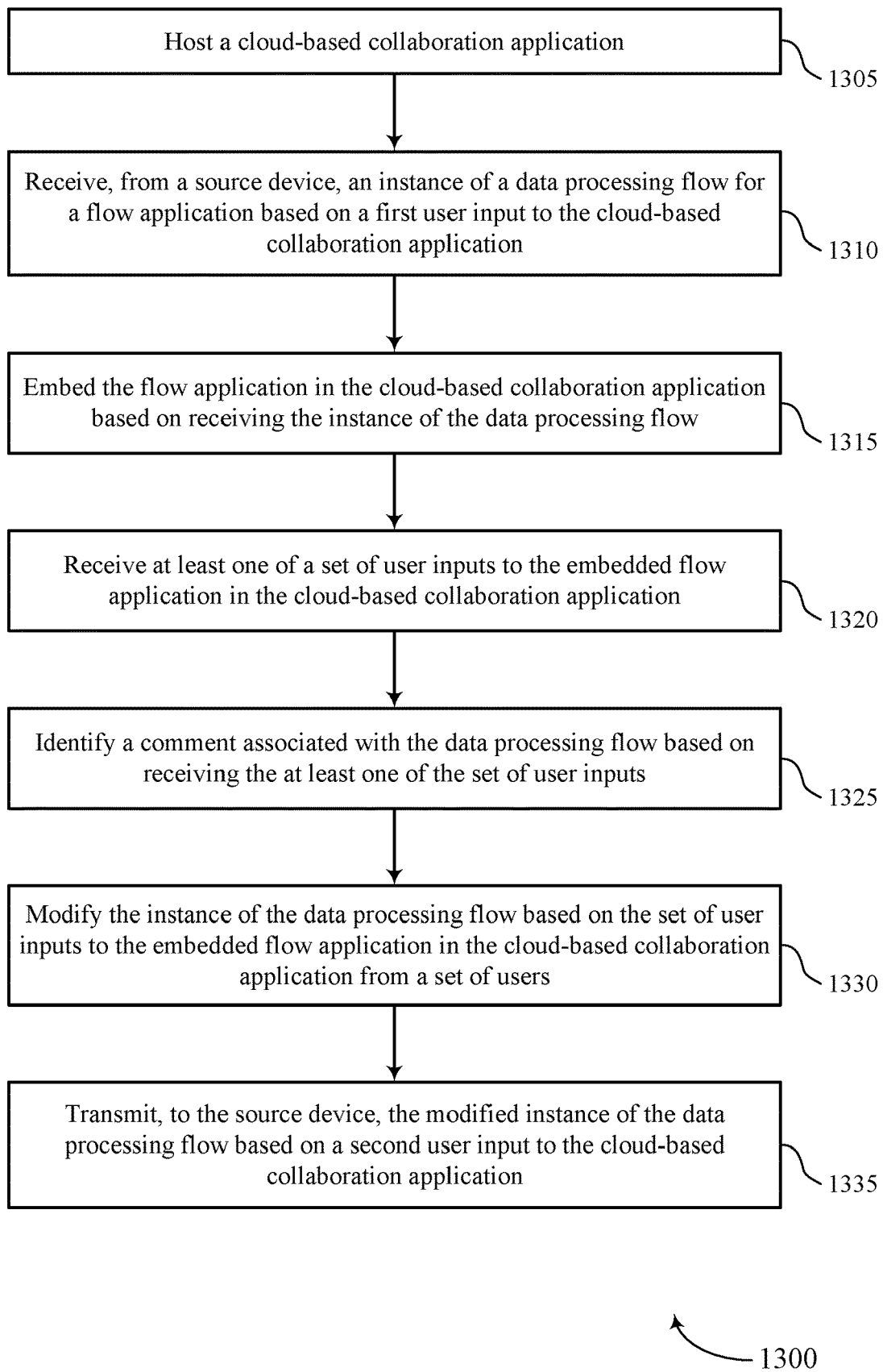

FIG. 13 shows a flowchart illustrating a method 1300 that supports building collaborative data processing flows in accordance with aspects of the present disclosure. The operations of method 1300 may be implemented by an application server or its components as described herein. For example, the operations of method 1300 may be performed by a collaboration module as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1305, the application server may host a cloud-based collaboration application. The operations of 1305 may be performed according to the methods described herein. In some examples, aspects of the operations of 1305 may be performed by a hosting component as described with reference to FIGS. 6 through 8.

At 1310, the application server may receive, from a source device, an instance of a data processing flow for a flow application based on a first user input to the cloud-based collaboration application. In some cases, the instance of the data processing flow includes a sequence of data processes. The operations of 1310 may be performed according to the methods described herein. In some examples, aspects of the operations of 1310 may be performed by a user input component as described with reference to FIGS. 6 through 8.

At 1315, the application server may embed the flow application in the cloud-based collaboration application based on receiving the instance of the data processing flow. The operations of 1315 may be performed according to the methods described herein. In some examples, aspects of the operations of 1315 may be performed by an embedding component as described with reference to FIGS. 6 through 8.

At 1320, the application server may receive at least one of a set of user inputs to the embedded flow application in the cloud-based collaboration application. The operations of 1320 may be performed according to the methods described herein. In some examples, aspects of the operations of 1320 may be performed by a user input component as described with reference to FIGS. 6 through 8.

At 1325, the application server may identify a comment associated with the data processing flow based on receiving the at least one of the set of user inputs. The operations of 1325 may be performed according to the methods described herein. In some examples, aspects of the operations of 1325 may be performed by a comment component as described with reference to FIGS. 6 through 8.

At 1330, the application server may modify the instance of the data processing flow based on the set of user inputs to the embedded flow application in the cloud-based collaboration application from a set of users. The operations of 1330 may be performed according to the methods described herein. In some examples, aspects of the operations of 1330 may be performed by a modifying component as described with reference to FIGS. 6 through 8.

At 1335, the application server may transmit, to the source device, the modified instance of the data processing flow based on a second user input to the cloud-based collaboration application. The operations of 1335 may be performed according to the methods described herein. In some examples, aspects of the operations of 1335 may be performed by a transmitting component as described with reference to FIGS. 6 through 8.

Figure 14:
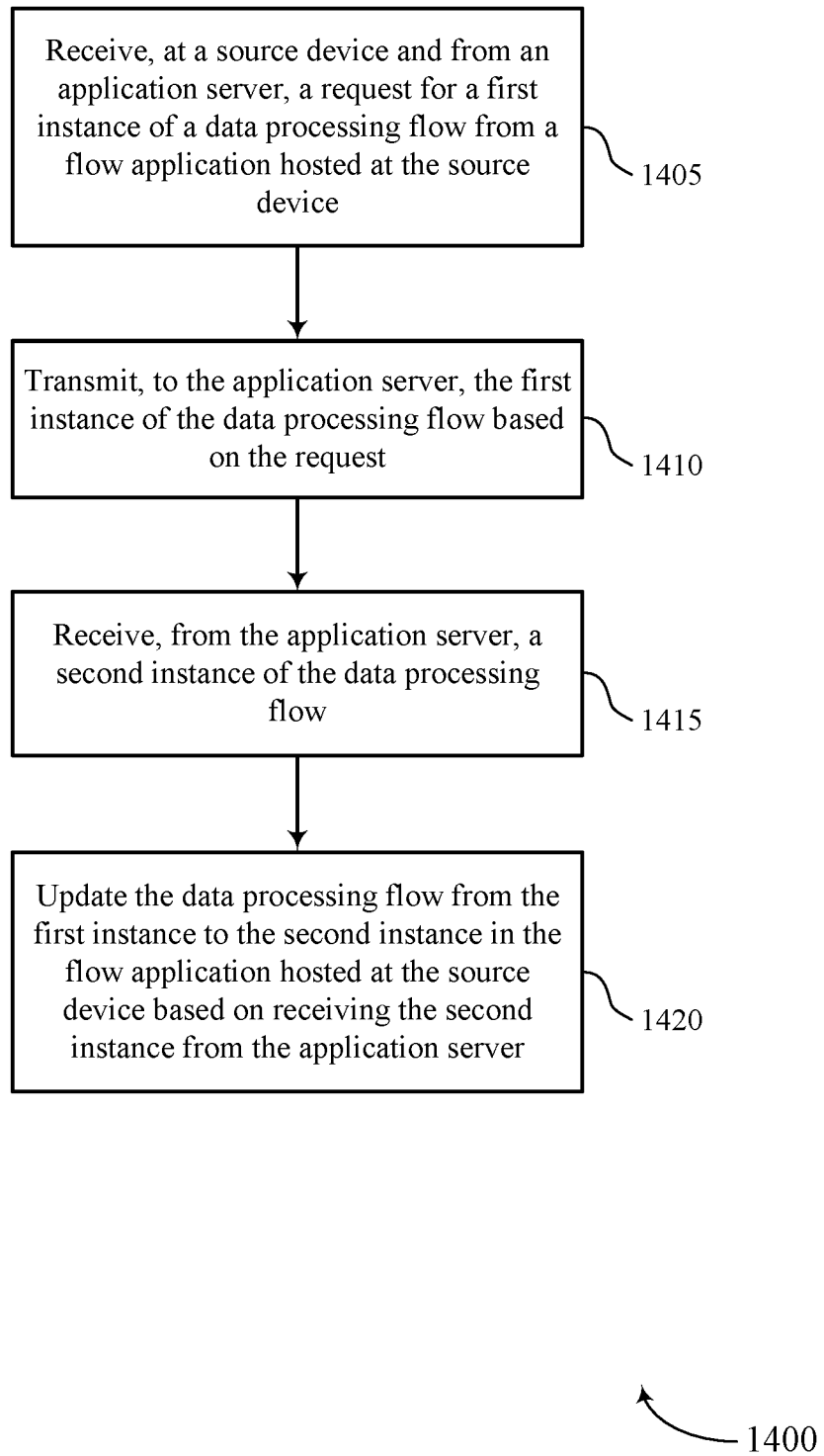

FIG. 14 shows a flowchart illustrating a method 1400 that supports building collaborative data processing flows in accordance with aspects of the present disclosure. The operations of method 1400 may be implemented by a device (e.g., a source device) or its components as described herein. For example, the operations of method 1400 may be performed by a collaboration module as described with reference to FIGS. 9 through 11. In some examples, a device may execute a set of instructions to control the functional elements of the device to perform the functions described below. Additionally or alternatively, the device may perform aspects of the functions described below using special-purpose hardware.

At 1405, the source device may receive, from an application server, a request for a first instance of a data processing flow from a flow application hosted at the source device. In some cases, the first instance of the data processing flow includes a first sequence of data processes. The operations of 1405 may be performed according to the methods described herein. In some examples, aspects of the operations of 1405 may be performed by a data processing flow component as described with reference to FIGS. 9 through 11.

At 1410, the device may transmit, to the application server, the first instance of the data processing flow based on the request. The operations of 1410 may be performed according to the methods described herein. In some examples, aspects of the operations of 1410 may be performed by a transmitting component as described with reference to FIGS. 9 through 11.

At 1415, the device may receive, from the application server, a second instance of the data processing flow. In some cases, the second instance of the data processing flow is based on the first instance of the data processing flow and a set of user inputs from a set of users. In some cases, the second instance of the data processing flow includes a second sequence of data processes different from the first sequence of data processes. The operations of 1415 may be performed according to the methods described herein. In some examples, aspects of the operations of 1415 may be performed by a data processing flow component as described with reference to FIGS. 9 through 11.

At 1420, the device may update the data processing flow from the first instance to the second instance in the flow application hosted at the source device based on receiving the second instance from the application server. The operations of 1420 may be performed according to the methods described herein. In some examples, aspects of the operations of 1420 may be performed by an update component as described with reference to FIGS. 9 through 11.

A method for managing a data processing flow at an application server is described. The method may include hosting, at the application server, a cloud-based collaboration application, receiving, from a source device, an instance of the data processing flow for a flow application based on a first user input to the cloud-based collaboration application, where the instance of the data processing flow includes a sequence of data processes, embedding the flow application in the cloud-based collaboration application based on receiving the instance of the data processing flow, modifying the instance of the data processing flow based on a set of user inputs to the embedded flow application in the cloud-based collaboration application from a set of users, and transmitting, to the source device, the modified instance of the data processing flow based on a second user input to the cloud-based collaboration application.

An apparatus for managing a data processing flow at an application server is described. The apparatus may include a processor, memory coupled with the processor, and instructions stored in the memory. The instructions may be executable by the processor to cause the apparatus to host, at the application server, a cloud-based collaboration application, receive, from a source device, an instance of the data processing flow for a flow application based on a first user input to the cloud-based collaboration application, where the instance of the data processing flow includes a sequence of data processes, embed the flow application in the cloud-based collaboration application based on receiving the instance of the data processing flow, modify the instance of the data processing flow based on a set of user inputs to the embedded flow application in the cloud-based collaboration application from a set of users, and transmit, to the source device, the modified instance of the data processing flow based on a second user input to the cloud-based collaboration application.

Another apparatus for managing a data processing flow at an application server is described. The apparatus may include means for hosting, at the application server, a cloud-based collaboration application, receiving, from a source device, an instance of the data processing flow for a flow application based on a first user input to the cloud-based collaboration application, where the instance of the data processing flow includes a sequence of data processes, embedding the flow application in the cloud-based collaboration application based on receiving the instance of the data processing flow, modifying the instance of the data processing flow based on a set of user inputs to the embedded flow application in the cloud-based collaboration application from a set of users, and transmitting, to the source device, the modified instance of the data processing flow based on a second user input to the cloud-based collaboration application.

A non-transitory computer-readable medium storing code for managing a data processing flow at an application server is described. The code may include instructions executable by a processor to host, at the application server, a cloud-based collaboration application, receive, from a source device, an instance of the data processing flow for a flow application based on a first user input to the cloud-based collaboration application, where the instance of the data processing flow includes a sequence of data processes, embed the flow application in the cloud-based collaboration application based on receiving the instance of the data processing flow, modify the instance of the data processing flow based on a set of user inputs to the embedded flow application in the cloud-based collaboration application from a set of users, and transmit, to the source device, the modified instance of the data processing flow based on a second user input to the cloud-based collaboration application.

Some examples of the method, apparatuses, and non-transitory computer-readable medium described herein may further include operations, features, means, or instructions for receiving the first user input to the cloud-based collaboration application and transmitting, to the source device, a request for the instance of the data processing flow based on receiving the first user input, where receiving the instance of the data processing flow may be based on transmitting the request.

In some examples of the method, apparatuses, and non-transitory computer-readable medium described herein, the first user input includes a request to embed the instance of the data processing flow for the flow application in the cloud-based collaboration application, and the instance of the data processing flow may be created at the source device.

Some examples of the method, apparatuses, and non-transitory computer-readable medium described herein may further include operations, features, means, or instructions for receiving a third user input to the cloud-based collaboration application, the third user input including a request to create a new instance of a second data processing flow for the flow application, and creating the new instance of the second data processing flow based on receiving the third user input and embedding the flow application in the cloud-based collaboration application.

Some examples of the method, apparatuses, and non-transitory computer-readable medium described herein may further include operations, features, means, or instructions for identifying an update to the data processing flow based on the set of user inputs to the embedded flow application in the cloud-based collaboration application, where the instance of the data processing flow may be modified based on the update to the data processing flow. Some examples of the method, apparatuses, and non-transitory computer-readable medium described herein may further include operations, features, means, or instructions for transmitting, to at least a first user device and a second user device, the modified instance of the data processing flow for display.

Some examples of the method, apparatuses, and non-transitory computer-readable medium described herein may further include operations, features, means, or instructions for transmitting, to at least a first user device and a second user device, a link of the cloud-based collaboration application to access the modified instance of the data processing flow. In some examples of the method, apparatuses, and non-transitory computer-readable medium described herein, the modified instance of the data processing flow includes a second sequence of data processes different from the sequence of data processes. Some examples of the method, apparatuses, and non-transitory computer-readable medium described herein may further include operations, features, means, or instructions for receiving at least one of the set of user inputs to the embedded flow application in the cloud-based collaboration application and identifying a comment associated with the data processing flow based on receiving the at least one of the set of user inputs.

In some examples of the method, apparatuses, and non-transitory computer-readable medium described herein, the sequence of data processes includes one or more elements, one or more connectors, one or more resources, one or more values associated with the data processing flow, or a combination thereof. Some examples of the method, apparatuses, and non-transitory computer-readable medium described herein may further include operations, features, means, or instructions for transmitting, to at least a first user device and a second user device, the cloud-based collaboration application for display and receiving the set of user inputs from one or more of the first user device and the second user device.

In some examples of the method, apparatuses, and non-transitory computer-readable medium described herein, the set of user inputs may be associated with the data processing flow. Some examples of the method, apparatuses, and non-transitory computer-readable medium described herein may further include operations, features, means, or instructions for receiving, from the source device, a second instance of a second data processing flow for the flow application based on a third user input to the cloud-based collaboration application and modifying the second instance of the second data processing flow based on the set of user inputs associated with the data processing flow and receiving the second instance of the second data processing flow. In some examples of the method, apparatuses, and non-transitory computer-readable medium described herein, the cloud-based collaboration application includes a cloud-based document application.

A method for managing a data processing flow at a source device is described. The method may include receiving, from an application server, a request for a first instance of the data processing flow from a flow application hosted at the source device, where the first instance of the data processing flow includes a first sequence of data processes, transmitting, to the application server, the first instance of the data processing flow based on the request, receiving, from the application server, a second instance of the data processing flow, where the second instance of the data processing flow is based on the first instance of the data processing flow and a set of user inputs from a set of users, and where the second instance of the data processing flow includes a second sequence of data processes different from the first sequence of data processes, and updating the data processing flow from the first instance to the second instance in the flow application hosted at the source device based on receiving the second instance from the application server.

An apparatus for managing a data processing flow at a source device is described. The apparatus may include a processor, memory coupled with the processor, and instructions stored in the memory. The instructions may be executable by the processor to cause the apparatus to receive, from an application server, a request for a first instance of the data processing flow from a flow application hosted at the source device, where the first instance of the data processing flow includes a first sequence of data processes, transmit, to the application server, the first instance of the data processing flow based on the request, receive, from the application server, a second instance of the data processing flow, where the second instance of the data processing flow is based on the first instance of the data processing flow and a set of user inputs from a set of users, and where the second instance of the data processing flow includes a second sequence of data processes different from the first sequence of data processes, and update the data processing flow from the first instance to the second instance in the flow application hosted at the source device based on receiving the second instance from the application server.

Another apparatus for managing a data processing flow at a source device is described. The apparatus may include means for receiving, from an application server, a request for a first instance of the data processing flow from a flow application hosted at the source device, where the first instance of the data processing flow includes a first sequence of data processes, transmitting, to the application server, the first instance of the data processing flow based on the request, receiving, from the application server, a second instance of the data processing flow, where the second instance of the data processing flow is based on the first instance of the data processing flow and a set of user inputs from a set of users, and where the second instance of the data processing flow includes a second sequence of data processes different from the first sequence of data processes, and updating the data processing flow from the first instance to the second instance in the flow application hosted at the source device based on receiving the second instance from the application server.

A non-transitory computer-readable medium storing code for managing a data processing flow at a source device is described. The code may include instructions executable by a processor to receive, from an application server, a request for a first instance of the data processing flow from a flow application hosted at the source device, where the first instance of the data processing flow includes a first sequence of data processes, transmit, to the application server, the first instance of the data processing flow based on the request, receive, from the application server, a second instance of the data processing flow, where the second instance of the data processing flow is based on the first instance of the data processing flow and a set of user inputs from a set of users, and where the second instance of the data processing flow includes a second sequence of data processes different from the first sequence of data processes, and update the data processing flow from the first instance to the second instance in the flow application hosted at the source device based on receiving the second instance from the application server.

Some examples of the method, apparatuses, and non-transitory computer-readable medium described herein may further include operations, features, means, or instructions for receiving, at the source device, an update to the data processing flow based on a user input to the flow application hosted at the source device and updating the data processing flow in the flow application hosted at the source device based on receiving the update. In some examples of the method, apparatuses, and non-transitory computer-readable medium described herein, receiving the second instance of the data processing flow may be based on a user input to a cloud-based collaboration application hosted at the application server. In some examples of the method, apparatuses, and non-transitory computer-readable medium described herein, the cloud-based collaboration application includes a cloud-based document application.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing real-time collaboration for a data processing flow at an application, comprising:
   creating, at the application, the data processing flow in response to a first user input sent from a first user device operated by a first user, wherein the first user can access the data processing flow based at least in part on the creating the data processing flow in response to the first user input;
   hosting, at the application, the data processing flow based at least in part on the creating the data processing flow, wherein the data processing flow comprises a sequence of data processes associated with data of a database system, and wherein the application provides interactive interfaces of the data processing flow comprising one or more elements representing one or more actions to execute using the data and one or more connectors representing one or more paths for executing the one or more actions at runtime, the one or more actions comprising a read operation, a write operation, a collect operation, a modify operation, or any combination thereof for the data;
   receiving a second user input sent from the first user device indicating to share the data processing flow with at least a plurality of users for editing by the plurality of users;
   granting the plurality of users access to the data processing flow based at least in part on the second user input indicating to share the data processing flow with at least the plurality of users;
   sending data indicating the data processing flow to a plurality of user devices corresponding to the plurality of users based at least in part on the second user input indicating to share the data processing flow;
   receiving, at the application and via the interactive interfaces of the data processing flow corresponding to the plurality of user devices, a plurality of user inputs from the plurality of users operating the plurality of user devices in communication with the application;
   modifying the data processing flow based at least in part on the received plurality of user inputs; and
   sending, via an application programming interface (API) that provides compatibility between the application and the database system, the data processing flow for execution at a device based at least in part on the modifying the data processing flow.

2. The method of claim 1, further comprising:
   embedding an instance of the data processing flow in a document based at least in part on the first user input.

3. The method of claim 1, further comprising:
   receiving an input from a user device of the plurality of user devices to run the data processing flow, wherein sending the data processing flow for execution is based at least in part on the input to run the data processing flow.

4. The method of claim 1, further comprising:
   receiving an input from a user device of the plurality of user devices to add an element to the data processing flow, add a connector to the data processing flow, or both, wherein the data processing flow is modified based at least in part on the input.

5. The method of claim 1, further comprising:
   receiving an input from a user device of the plurality of user devices to remove an element from the data processing flow, remove a connector from the data processing flow, or both, wherein the data processing flow is modified based at least in part on the input.

6. The method of claim 1, further comprising:
sending, for display at the plurality of user devices, edits to the data processing flow based at least in part on the received plurality of user inputs.

7. The method of claim 6, wherein the edits indicate real-time, concurrent modifications to the data processing flow corresponding to the received plurality of user inputs.

8. The method of claim 1, wherein the plurality of users is associated with an organization.

9. The method of claim 1, wherein the application comprises a cloud-based application.

10. An apparatus for managing real-time collaboration for a data processing flow at an application, comprising:
a processor;
memory coupled with the processor; and
instructions stored in the memory and executable by the processor to cause the apparatus to:
create, at the application, the data processing flow in response to a first user input sent from a first user device operated by a first user, wherein the first user can access the data processing flow based at least in part on the creating the data processing flow in response to the first user input;
host, at the application, the data processing flow based at least in part on the creating the data processing flow, wherein the data processing flow comprises a sequence of data processes associated with data of a database system, and wherein the application provides interactive interfaces of the data processing flow comprising one or more elements representing one or more actions to execute using the data and one or more connectors representing one or more paths for executing the one or more actions at runtime, the one or more actions comprising a read operation, a write operation, a collect operation, a modify operation, or any combination thereof for the data;
receive a second user input sent from the first user device indicating to share the data processing flow with at least a plurality of users for editing by the plurality of users;
grant the plurality of users access to the data processing flow based at least in part on the second user input indicating to share the data processing flow with at least the plurality of users;
send data indicating the data processing flow to a plurality of user devices corresponding to the plurality of users based at least in part on the second user input indicating to share the data processing flow;
receive, at the application and via the interactive interfaces of the data processing flow corresponding to the plurality of user devices, a plurality of user inputs from the plurality of users operating the plurality of user devices in communication with the application;
modify the data processing flow based at least in part on the received plurality of user inputs; and
send, via an application programming interface (API) that provides compatibility between the application and the database system, the data processing flow for execution at a device based at least in part on the modifying the data processing flow.

11. The apparatus of claim 10, wherein the instructions are further executable by the processor to cause the apparatus to:
embed an instance of the data processing flow in a document based at least in part on the first user input.

12. The apparatus of claim 10, wherein the instructions are further executable by the processor to cause the apparatus to:
receive an input from a user device of the plurality of user devices to run the data processing flow, wherein sending the data processing flow for execution is based at least in part on the input to run the data processing flow.

13. The apparatus of claim 10, wherein the instructions are further executable by the processor to cause the apparatus to:
receive an input from a user device of the plurality of user devices to add an element to the data processing flow, add a connector to the data processing flow, or both, wherein the data processing flow is modified based at least in part on the input.

14. The apparatus of claim 10, wherein the instructions are further executable by the processor to cause the apparatus to:
receive an input from a user device of the plurality of user devices to remove an element from the data processing flow, remove a connector from the data processing flow, or both, wherein the data processing flow is modified based at least in part on the input.

15. The apparatus of claim 10, wherein the instructions are further executable by the processor to cause the apparatus to:
send, for display at the plurality of user devices, edits to the data processing flow based at least in part on the received plurality of user inputs.

16. A non-transitory computer-readable medium storing code for managing real-time collaboration for a data processing flow at an application, the code comprising instructions executable by a processor to:
create, at the application, the data processing flow in response to a first user input sent from a first user device operated by a first user, wherein the first user can access the data processing flow based at least in part on the creating the data processing flow in response to the first user input;
host, at the application, the data processing flow based at least in part on the creating the data processing flow, wherein the data processing flow comprises a sequence of data processes associated with data of a database system, and wherein the application provides interactive interfaces of the data processing flow comprising one or more elements representing one or more actions to execute using the data and one or more connectors representing one or more paths for executing the one or more actions at runtime, the one or more actions comprising a read operation, a write operation, a collect operation, a modify operation, or any combination thereof for the data;
receive a second user input sent from the first user device indicating to share the data processing flow with at least a plurality of users for editing by the plurality of users;
grant the plurality of users access to the data processing flow based at least in part on the second user input indicating to share the data processing flow with at least the plurality of users;
send data indicating the data processing flow to a plurality of user devices corresponding to the plurality of users based at least in part on the second user input indicating to share the data processing flow;
receive, at the application and via the interactive interfaces of the data processing flow corresponding to the plurality of user devices, a plurality of user inputs from the plurality of users operating the plurality of user devices in communication with the application;

modify the data processing flow based at least in part on the received plurality of user inputs; and send, via an application programming interface (API) that provides compatibility between the application and the database system, the data processing flow for execution at a device based at least in part on the modifying the data processing flow.

17. The non-transitory computer-readable medium of claim 16, wherein the instructions are further executable by the processor to:

embed an instance of the data processing flow in a document based at least in part on the first user input.

18. The non-transitory computer-readable medium of claim 16, wherein the instructions are further executable by the processor to:

receive an input from a user device of the plurality of user devices to run the data processing flow, wherein sending the data processing flow for execution is based at least in part on the input to run the data processing flow.

19. The non-transitory computer-readable medium of claim 16, wherein the instructions are further executable by the processor to:

receive an input from a user device of the plurality of user devices to add an element to the data processing flow, add a connector to the data processing flow, or both, wherein the data processing flow is modified based at least in part on the input.

20. The non-transitory computer-readable medium of claim 16, wherein the instructions are further executable by the processor to:

receive an input from a user device of the plurality of user devices to remove an element from the data processing flow, remove a connector from the data processing flow, or both, wherein the data processing flow is modified based at least in part on the input.

\* \* \* \* \*